（12）United States Patent
Kale et al.

(10) Patent No.: US 12,246,736 B2
(45) Date of Patent: Mar. 11, 2025

(54) IMAGE SENSOR FOR PROCESSING SENSOR DATA TO REDUCE DATA TRAFFIC TO HOST SYSTEM

(71) Applicant: Micron Technology, Inc., Boise, ID (US)

(72) Inventors: Poorna Kale, Folsom, CA (US); Amit Gattani, Granite Bay, CA (US)

(73) Assignee: Micron Technology, Inc., Boise, ID (US)

( * ) Notice: Subject to any disclaimer, the term of this patent is extended or adjusted under 35 U.S.C. 154(b) by 183 days.

(21) Appl. No.: 16/942,438

(22) Filed: Jul. 29, 2020

(65) Prior Publication Data

US 2022/0032932 A1 Feb. 3, 2022

(51) Int. Cl.
*B60W 50/04* (2006.01)
*G06F 13/42* (2006.01)
*G06F 18/214* (2023.01)
*G06F 18/24* (2023.01)
*G06N 3/08* (2023.01)

(52) U.S. Cl.
CPC ....... *B60W 50/045* (2013.01); *G06F 13/4282* (2013.01); *G06F 18/2155* (2023.01); *G06F 18/24* (2023.01); *G06N 3/08* (2013.01); *B60W 2420/408* (2024.01); *B60W 2510/18* (2013.01); *B60W 2510/20* (2013.01)

(58) Field of Classification Search
None
See application file for complete search history.

(56) References Cited

U.S. PATENT DOCUMENTS

| 12,020,149 B2 | 6/2024 | Kale et al. |
| 2018/0322386 A1* | 11/2018 | Sridharan ................ G06F 9/54 |
| 2018/0341706 A1* | 11/2018 | Agrawal .............. G06F 16/7844 |
| 2019/0042488 A1 | 2/2019 | Guim Bernat et al. |

(Continued)

FOREIGN PATENT DOCUMENTS

JP 6391086 B2 * 9/2018

OTHER PUBLICATIONS

Amir, Mohammad Faisal, et al. "3D Stacked High Throughput Pixel Parallel Image Sensor with Integrated ReRAM Based Neural Accelerator." (abstract only) IEEE SOI-3D-Subthreshold Microelectronics Technology Unified Conference (S3S), IEEE, Oct. 15, 2018.

(Continued)

*Primary Examiner* — Erin D Bishop
*Assistant Examiner* — Mahmoud M Kazimi
(74) *Attorney, Agent, or Firm* — Greenberg Traurig

(57) ABSTRACT

Systems, methods and apparatus of integrated image sensing devices. In one example, a system includes a sensor that generates data. A memory device stores the generated data, and further stores a first portion of an artificial neural network (ANN). A host interface of the system is configured to communicate with a host system that stores a second portion of the ANN. The memory device can be stacked with the sensor. The memory device includes an inference engine configured to generate inference results using the stored data as input to the first portion of the ANN. The host interface is further configured to send the inference results to the host system for processing by the host system using the second portion of the ANN.

17 Claims, 15 Drawing Sheets

(56) References Cited

U.S. PATENT DOCUMENTS

| | | |
|---|---|---|
| 2019/0047580 A1 | 2/2019 | Kwasnick et al. |
| 2019/0049957 A1* | 2/2019 | Healey ................. B60W 40/08 |
| 2019/0065410 A1* | 2/2019 | Bigioi ................. G06F 9/44505 |
| 2019/0212981 A1 | 7/2019 | Park |
| 2019/0228495 A1* | 7/2019 | Tremblay ............... G06N 3/084 |
| 2019/0258251 A1* | 8/2019 | Ditty ...................... G06V 20/58 |
| 2019/0258878 A1 | 8/2019 | Koivisto et al. |
| 2019/0295261 A1 | 9/2019 | Kang et al. |
| 2021/0072901 A1* | 3/2021 | Kale ...................... G06N 3/049 |
| 2021/0127090 A1 | 4/2021 | Kale et al. |
| 2021/0142146 A1 | 5/2021 | Kale et al. |
| 2021/0255637 A1 | 8/2021 | Kale et al. |
| 2022/0036164 A1 | 2/2022 | Kale et al. |
| 2022/0036190 A1 | 2/2022 | Ito et al. |
| 2022/0271069 A1 | 8/2022 | Fukui |
| 2022/0271930 A1 | 8/2022 | Takatsuka et al. |

OTHER PUBLICATIONS

International Search Report and Written Opinion, PCT/US2021/042673, mailed on Jan. 7, 2022.

Mukhopodhyay, Saibal, et al. "The Camel approach to stacked sensor smart cameras." Design, Automation & Test in Europe Conference & Exhibition, EDAA, Mar. 19, 2018.

International Search Report and Written Opinion, PCT/US2020/057455, mailed on Mar. 19, 2021.

Chen, Xizi, et al., "SubMac: Exploiting the subword-based computation in RRAM-based CNN accelerator for energy saving and speedub." Integration, the VLI Journal, Elsevier, 2019.

Polikar, Robi, "Ensemble Based Systems in Decision Making." IEEE Circuits and Systems Magazine, IEEE, 2006.

Querlioz, Damien, et al., "Simulation of a Memristor-Based Spiking Neural Network Immune to Device Variations." Proceedings of International Joint Conference on Neural Networks, IEEE, 2011.

\* cited by examiner

IMAGE SENSOR FOR PROCESSING SENSOR DATA TO REDUCE DATA TRAFFIC TO HOST SYSTEM

FIELD OF THE TECHNOLOGY

At least some embodiments disclosed herein relate to image sensing devices in general and more particularly, but not limited to, intelligent image sensing systems including a memory device that uses an inference engine to reduce data transmission to host systems.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
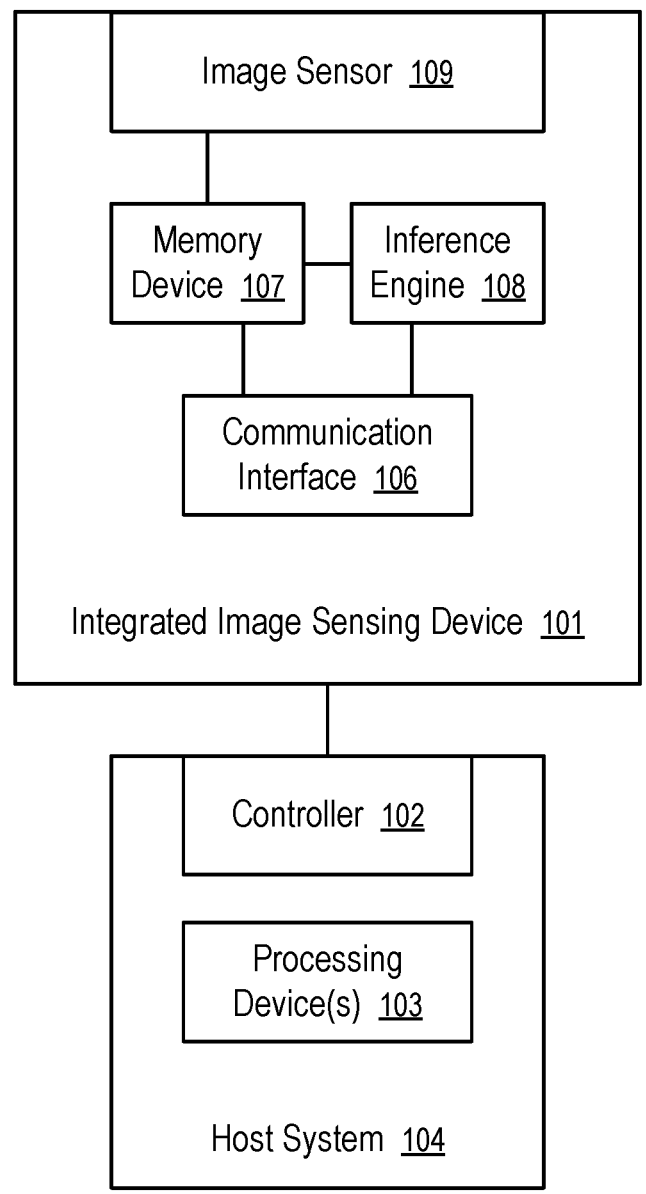
FIG. 1 shows an integrated image sensing device connected to a host system according to one embodiment.

At least some embodiments disclosed herein provide systems, methods and apparatus to process image data within an integrated image sensing device to reduce data traffic to a host system, such as an image sensing device configured in a motor vehicle, or another vehicle, with or without an Advanced Driver Assistance System (ADAS).

For example, an integrated image sensing device can include an image sensor, a memory device, and an inference engine configured to convert images generated by the image sensor into inference results for transmitting to a host system for further analysis and thus reduce or eliminate the need to transmit to the host system the pixel image data.

For example, the image sensor can be formed on an integrated circuit die. The inference engine can be implemented via logic circuits formed on another integrated circuit die; and memory cells of the memory device can be formed on one or more further integrated circuit dies. The integrated circuit dies of the inference engine and integrated circuit dies of the memory device can be stacked on the back of the integrated circuit die of the image sensor, connected using Through-Silicon Via (TSV) (or through wire bonding, or other interconnect techniques), and enclosed within an integrated circuit package. Optionally, the pins of the integrated circuit package of the integrated image sensing device can be configured to communicate with a host system using a standardized communication protocol for memory devices or storage devices, as if the integrated image sensing device were a storage device, or a memory chip. For example, the integrated image sensing device can be packaged to have a form factor and/or the interface of a Ball Grid Array (BGA) Solid State Drive (SSD).

Alternatively, the image sensor, the inference engine, and/or the integrated circuit memory can be enclosed in separate integrated circuit packages that are connected via a printed circuit board configured within a housing of the image sensing device. The image sensing device can be connected to a host system via a memory bus, or a peripheral bus, as if the image sensing device were a memory device, or a storage device.

The high data communication bandwidth configured within the image sensing devices allows the image sensor to capture images at a high number of frames per second than that would be allowed to be transmitted over a conventional connection from a peripheral device to a host system. The inference engine processes the images and/or performs analytics to generate inference results with a data size that is significantly smaller than the size of the pixel images generated by the image sensor. Thus, the data traffic upstream from the image sensing device to the host system can be reduced.

For example, an image sensing device according to one embodiment disclosed herein can be used in an ADAS of a vehicle (e.g., an autonomous driving system). The analytics capability of the image sensing device allows the vehicle to offload a portion of its image based ANN processing to the image sensing device and thus frees its processing power and communication bandwidth for other tasks. The vehicle can make driving decisions based on images at a frame number per second higher than that limited by the communication bandwidth of a connection between the image sensing device and a processor of the vehicle.

Image sensors in cameras used in automotive and other applications can generate millions of pixels per frame and several frames per second. This data traffic is typically routed to a Central Processing Unit (CPU) for processing. Such an arrangement can clog the CPU and ultimately result in a restriction on the number of frames per second that can be processed. The techniques of image sensing devices disclosed herein remove or reduce such restrictions.

When an integrated image sensing device having memory and an inference engine stacked with an image sensor is used, the image data is reduced to inference results that can be further processed by the CPU (e.g., in a further ANN). For example, an ANN for an ADAS can include a portion that is configured to process images from a camera. Such a portion can be configured in the inference engine of the integrated image sensing device to generate neuron outputs that is communicated from the integrated image sensing device. Instead of the image data, the neuron outputs can be transmitted from the integrated image sensing device to allow the remaining portion of the ANN of the ADAS to complete its inference.

For example, the portion of ANN implemented in the inference engine of the integrated image sensing device can perform machine learning based analytics, such as pixel segmentation, feature extraction, object detection, and/or object classification, such that the need to transmit to a host system the data about individual pixels can be reduced or eliminated.

Preferably, the memory device in the integrated image sensing device has wide input/output connection to offer high bandwidth with the image sensor and the inference engine optimized for machine learning tasks. Optionally, the memory device can include built in functions for accelerating certain ANN operations, such as dot-product and tensor access.

FIG. 1 shows an integrated image sensing device (101) connected to a host system (104) according to one embodiment.

In FIG. 1, the integrated image sensing device (101) has an image sensor (109), a memory device (107), an inference engine (108), and a communication interface (106).

In one embodiment, the image sensor (109), the memory device (107), the inference engine (108), and the communication interface (106) are formed on multiple integrated circuit dies that are stacked to form a Three-Dimensional Integrated Circuit (3D IC). Through-Silicon Via (TSV) can be used to implement high communication bandwidth among the image sensor (109), the memory device (107), and the inference engine (108). Further, the memory device (107) can be configured to accelerate and/or optimize the operations of the inference engine (108), as discussed further below.

Optionally, the integrated image sensing device (101) can be enclosed in one integrated circuit package with input/output connections to a controller (102) of the host system (104). For example, the integrated image sensing device (101) can be package as a BGA SSD that has the image sensor (109) and the inference engine (108). For example, the connection between the integrated image sensing device (101) and the host system (104) can be in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

In some implementations, the inference engine (108) includes programmable processing units; and the instructions for the processing units can be stored in the memory device (107) to customize the operations of the inference engine (108).

For example, an ANN model can be stored in the memory device (107); and the inference engine (108) is configured to apply the ANN model to the images from the image sensor (109) to generate inference results and store the inference results in the memory device (107). The host system (104) has one or more processing device(s) (103) and a controller (102) to access the communication interface (106) over communication link between the integrated image sensing device (101) and the host system (104). The host system (104) can issue read commands to retrieve the inference results stored in the memory device (107). For example, the communication interface (106) can include an interface in accordance with a Non-Volatile Memory Host Controller Interface Specification (NVMHCIS) or NVM Express (NVMe). For example, the NVMe interface of the integrated image sensing device (101) can be used to receive data and commands from the host system (104). For example, the host system (104) can send write commands to store the ANN model into the memory device (107) of the integrated image sensing device (101) and read commands to retrieve inference results of the inference engine (108) from the memory device (107) in accordance with an NVMe protocol. For example, the communication interface (106) can be configured to allow the host system (104) to access the memory device (107) of the integrated image sensing device (101) as a Solid State Drive (SSD). Optionally, the communication interface (106) (or another interface) can include an NVMe interface for communicating with an external Solid State Drive (SSD) (e.g., separate from the integrated image sensing device (101) and the host system (104)) to store inference results generated by the inference engine (108) and/or image data generated by the image sensor (109) or derived from the images generated by the image sensor (109).

Figure 2:
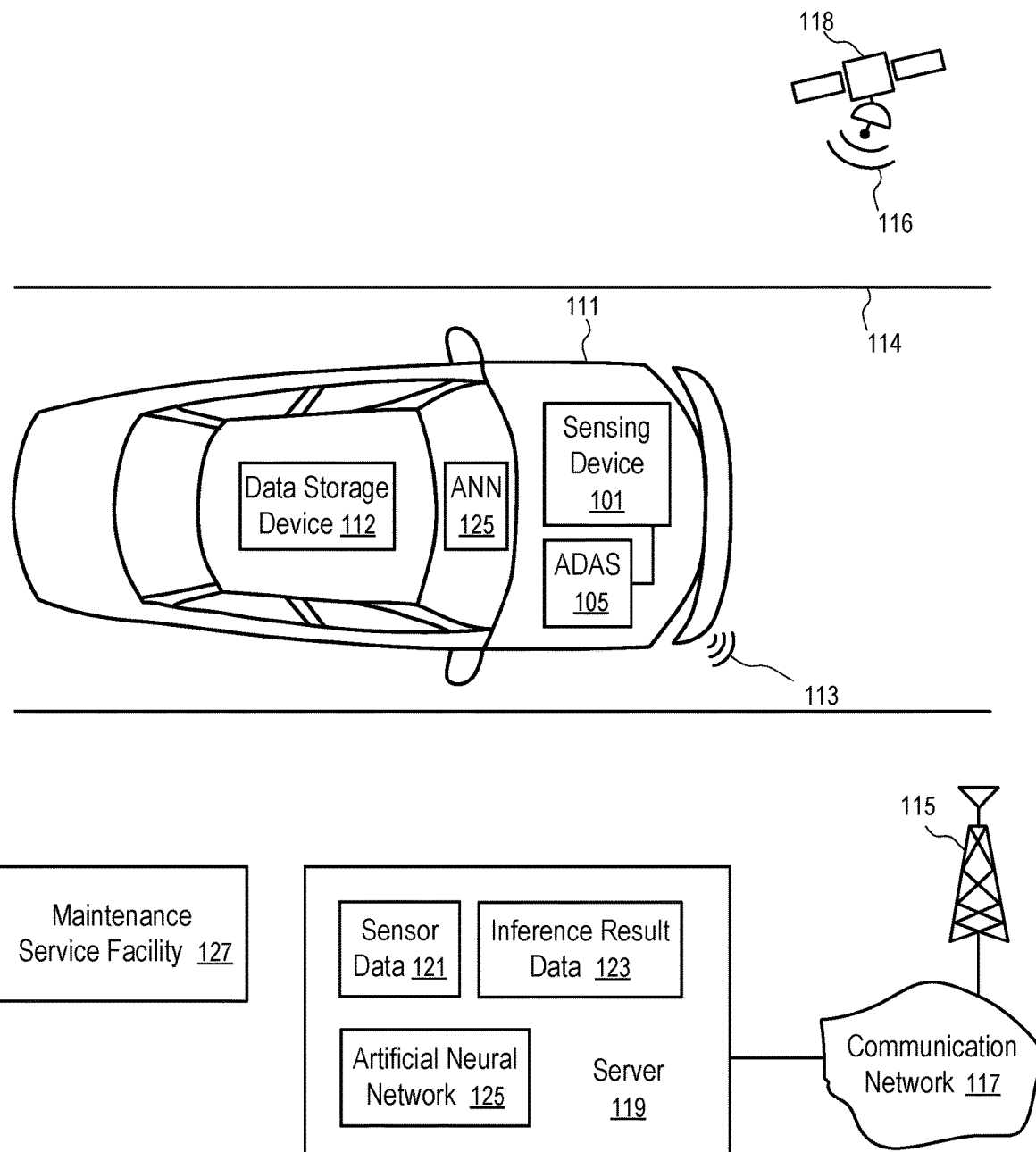
FIG. 2 shows a system having a vehicle configured to collect and process sensor data according to some embodiments.

For example, the integrated image sensing device (101) can be configured in a vehicle illustrated in FIG. 2.

FIG. 2 shows a system having a vehicle (111) configured to collect and process sensor data according to some embodiments.

The vehicle (111) in FIG. 2 has a data storage device (112), an image sensing device (101) (e.g., as illustrated in FIG. 1), an ANN (125), and an ADAS (105) configured to process sensor data, including inputs from the image sensing device (101), to generate control signals for the vehicle (111).

In general, one or more sensors (e.g., 101) can be configured on the vehicle (111) to generate senor data input to the ADAS (105) and/or the data storage device (112). The data storage device (112) and/or the ADAS (105) can be configured to use the ANN (125) to generate inference results. The inference results can include a control signal for operating or driving the vehicle (111), a suggestion for a maintenance service of the vehicle (111), etc.

In some implementations, at least a portion of the data generate by the sensors (e.g., 101) is used in both the ADAS (105) for driver assistance and in the ANN (125) for maintenance prediction. Optionally, the output of the ANN (124) can be used in both the data storage device (112) and in the ADAS (105). The ANN (125) can be part of the ADAS (105).

The image sensing device (101) can be configured in a digital camera, lidar, radar, ultrasound sonar, etc. The inference engine (108) of the image sensing device (101) is configured to process the images within the sensing device (101) and communicate its inference results to the ADAS (105), the ANN (125) and/or the data storage device (112).

Optionally, the ADAS (105) can selectively requests the sensing device (101) to transmit selected images from the sensing device (101), when the inference outputs from the sensing device (101) satisfy certain requirements, or when the ADAS (105) or the ANN (125) determines a need to further analyze the images that generate the inference results from the sensing device (101). Such images can be part of sensor data (121) is that further analyzed to further train the ANN (125) on the server (119) to generate desired inference results (e.g., 123).

For example, when the object recognition or classification in the sensing device (101) and/or in the ADAS (105) encounters unknowns, difficulties, uncertainties, or when a situation is to be further analyzed, the ADAS (105) can request the sensing device (101) to transmit the corresponding images for storing in the data storage device (112). The stored data can be subsequently further processed by a server (119) and/or a maintenance service facility (127).

In general, the vehicle (111) can have other sensors that provide inputs for the ADAS (105), such as brake sensors, speed sensors, acceleration sensors, airbag sensors, a GPS (Global Positioning System) receiver, audio sensors/microphones, vibration sensors, force/stress sensors, deformation sensors, motion sensors, temperature sensors, etc. Some of the sensors (101) can be configured primarily to monitor the environment of the vehicle (111) for driving decisions and/or assistances; and other sensors (101) can be configured primarily to monitor the operating and/or health conditions of one or more component of the vehicle (111), such as an internal combustion engine, an exhaust system, an electric motor, a brake, a tire, a battery, etc.

In general, the outputs of the sensor(s) (e.g., 101) as a function of time are provided as a sensor data stream to the ADAS (105) and/or the ANN (125) to provide driver assistance (e.g., autonomous driving) and maintenance prediction. In FIG. 2, the image sensing device (101) is further configured to provide its inference results generated from its images as part of the sensor data stream, instead of transmitting the images to the main processor of the vehicle (111) implementing the ANN (125). Thus, the data size of the sensor data stream can be reduced, the communication bandwidth from the sensing device (101) to the ADAS (105) and/or the data storage device (112) can be reduced, and the computation load on the ADAS (105) and/or the data storage device (112) can be reduced.

The ANN (125) can include an SNN configured to classify time-based variations of sensor data and/or detect deviation from known patterns of sensor data of the vehicle (111). When the ANN (125) detects the deviation from known patterns, the sensor data corresponding to the deviation can be stored in the data storage device (112) for further analysis and/or for further training of the ANN (125).

The data storage device (112) of the vehicle (111) can be configured to record sensor data for a period of time that can be used in the ANN (125) for predictive maintenance and/or used to further train the ANN (125). The maintenance service facility (e.g., 127) can download the sensor data (121) from the data storage device (112) and provide the sensor data (121) and the corresponding inference result data (123) to the server (119) to facilitate the training of the ANN (125).

Optionally, or in combination, the data storage device (112) is configured with a machine learning module to customize and/or train the ANN (125) installed in the vehicle (111).

The vehicle (111) can have a wireless communication device to communicate with a remote server (119) via wireless signals (113) and a communication network (117). The remote server (119) is typically configured at a location away from a road (114) on which the vehicle (111) is in service. For example, the vehicle (111) may provide some sensor data (121) to the server (119) and receive update of the ANN (125) from the server (119).

The communication network (117) can be a cellular phone network having one or more base stations (e.g., 115) to receive the wireless signals (e.g., 113). Alternatively, or in combination, the communication network (117) can include the Internet, where the wireless local area network signals (e.g., 113) transmitted by the vehicle (113) is received in an access point (e.g., 115) for further communication to the server (119). In some implementations, the vehicle (111) uses a communication link (116) to a satellite (118) or a communication balloon to communicate with the server (119).

The server (119) can also communicate with one or more maintenance service facilities (e.g., 127) to receive the sensor data (121) and/or the desired inference result data (123) of vehicles (e.g., 111).

For example, the desired inference result data (123) can be generated by a human operator inspecting the sensor data (121) (e.g., images from the image sensing device (101)) and/or relevant conditions of the vehicle (111). For example, the desired inference result data (123) can include inspection records and/or service records of components of the vehicles (e.g., 111). For example, the inspection records and/or service records can indicate the degree of wear and tear of components inspected during their services at the maintenance service facilities (e.g., 127), the identification of failed or malfunctioning components, etc. The sensor data (121) of the vehicles (e.g., 111) obtained in a time period relevant to the desired inference result data (123) can be used to train an ANN (125) at the server (119) to improve inference capability of the ANN (125).

The updated ANN (125) can be installed in the vehicle (111) at the maintenance service facility (127). Alternatively, the update ANN (125) can be transmitted to the vehicle (111) to update the vehicle (111) over the air.

A portion of the ANN (125) responsible for the processing of images generated in the image sensing device (101) can be configured in the memory device (107) for the inference engine (108) of the image sensing device (101). The inference engine (108) processes images generated in the image sensing device (e.g., generated by the image sensor (109)) and causes the inferences results generated from the images to be transmitted from the image sensing device (101) to the ADAS (105). Thus, the data traffic from the sensing device (101) to the ADAS (105) can be reduced without sacrificing the quality of data inferred from the images.

Figure 3:
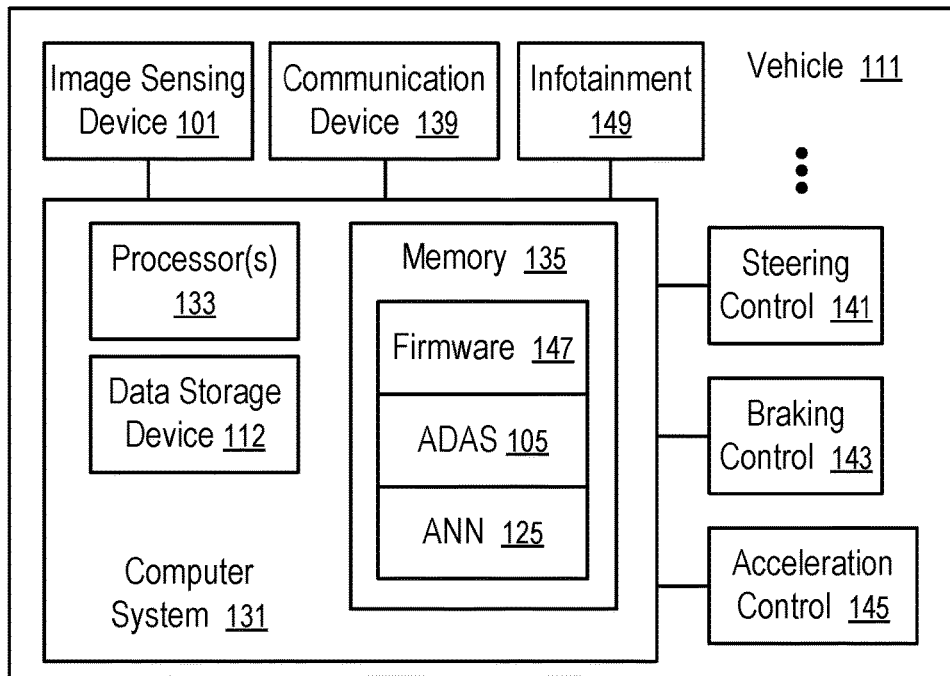
FIG. 3 shows an autonomous vehicle according to one embodiment.

FIG. 3 shows an autonomous vehicle (111) according to one embodiment. For example, the vehicle (111) in the system of FIG. 2 can be implemented using the autonomous vehicle (111) of FIG. 3.

In general, the vehicle (111) can include an infotainment system (149), a communication device (139), one or more sensors (e.g., 101), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 2 has a similar configuration and/or similar components.

The vehicle (111) of FIG. 3 is configured with an Advanced Driver Assistance System (ADAS) (105). The ADAS (105) of the vehicle (111) can have an Artificial Neural Network (ANN) (125) for object detection, recognition, identification, and/or classification, based on images generated in the image sensing device (101). An image processing portion of the ANN (125) can be implemented using the integrated image sensing device (101) of FIG. 1.

At least a portion of the ANN (125) is implemented in the image sensing device (101) using its integrated inference engine (108).

For example, a portion of the ANN (125) that operates based on the images generated in the image sensing device (101) can be stored in the image sensing device (101). The inference engine (108) performs the communication according to the portion of the ANN (125) such that the amount of communications from the imaging sensing device (101) to the computer system (131) of the vehicle (111) include neuron outputs and/or inference results from the portion of the ANN (125) implemented in the image sensing device (101), but not the image data of individual pixels.

In some implementations, the computation of the portion of the ANN (125) implemented in the image sensing device (101) does not depend on sensor data that is not generated in the image sensing device (101).

Alternatively, the computation of the portion of the ANN (125) implemented in the image sensing device (101) can further be based on sensor data not generated in the image sensing device (101). For example, the computer system (131) provides the sensor data to image sensing device (101) (e.g., by writing the sensor data into the memory device (107) through the communication interface (106)). By combining the sensor data provided by the computer system (131) and the image data generated by the image sensing device (101) according to the portion of the ANN (125) that is stored/implemented in the image sensing device (101), the amount of inference results from the image sensing device (101) can be reduced (e.g., in some ways of partitioning the ANN (125)). When data traffic of sending the relevant sensor data to the image sensing device (101) is smaller than the reduction in data size in inference results, sending the relevant sensor data for processing in the image sensing device (101) can be beneficial in reducing the overall communication traffic between the image sensing device (101) and the computer system (131) of the vehicle (111). Optionally, the selection of the portion of the ANN (125) for implementation in the image sensing device (101) can be based at least in part on the minimization of the data traffic between the image sensing device (101) and the computer system (131).

The computer system (131) of the vehicle (111) can include one or more processors (133), a data storage device (112), and memory (135) storing firmware (or software) (147), including the computer instructions and data models for ADAS (105).

Sensors of the vehicle (111) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors of the vehicle (111) can include audio sensors (e.g., microphone) configured to monitor noises from various components and locations in the vehicle (111), a vibration sensor, a pressure sensor, a force sensor, a stress sensor, and/or a deformation sensor configured to measure loads on a component of the vehicle (111), accelerometers and/or gyroscope sensors measuring the motions of some components of the vehicle (111), etc. Such sensors can be used to monitor the operating status and/or health of the components for predictive maintenance.

The sensor(s) (e.g., 101) can provide a stream of real time sensor data to the computer system (131). The sensor data generated by an image sensing device (101) of the vehicle (111) can include an image that captures an object using a camera that images using lights visible to human eyes, or a camera that images using infrared lights, or a sonar, radar, or LIDAR system. Preferably, the image is processed by the inference engine (108) of the image sensing device (101) to generate inference results as the output of the image sensing device (101) and thus reduce or eliminate the need to transmit pixel image data to the computer system (131).

For example, a camera having the image sensing device (101) can be used to obtain roadway information for the travel of the vehicle (111), which can be processed by the ANN (125) to generate control signals for the vehicle (111). For example, a camera having the image sensing device (101) can be used to monitor the operation state/health of a component of the vehicle (111), which can be processed by the ANN (125) to predict or schedule a maintenance service.

The infotainment system (149) of the vehicle (111) can be used to present data and/or inference results from the image sensing device (101). For example, compressed images with reduced resolution and refreshing frequency can be generated in the image sensing device (101) and transmitted to the infotainment system (149) for presentation to an occupant of the vehicle (111). Optionally, the communication device (139) can establish a connection to a mobile device of an occupant of the vehicle (111) to make the presentation.

When the vehicle (111) is configured with an ADAS (105), the outputs of the ADAS (105) can be used to control (e.g., 141, 143, 145) the acceleration of the vehicle (111), the speed of the vehicle (111), and/or the direction of the vehicle (111), during autonomous driving.

Figure 4:
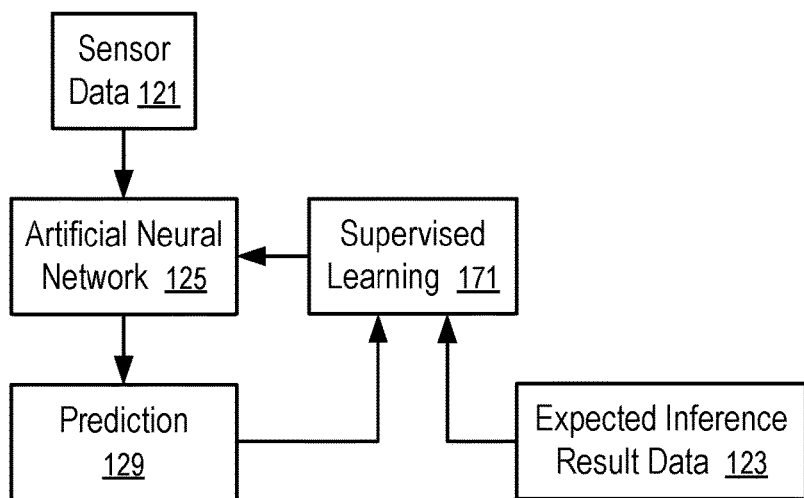
FIGS. 4-6 illustrate training of artificial neural networks for prediction according to some embodiments.
Figure 5:
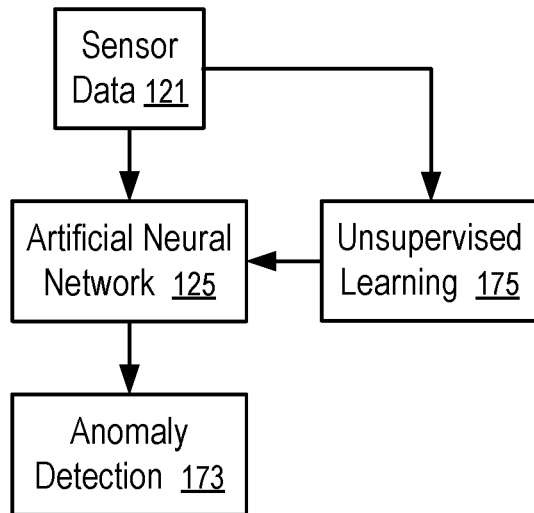
Figure 6:
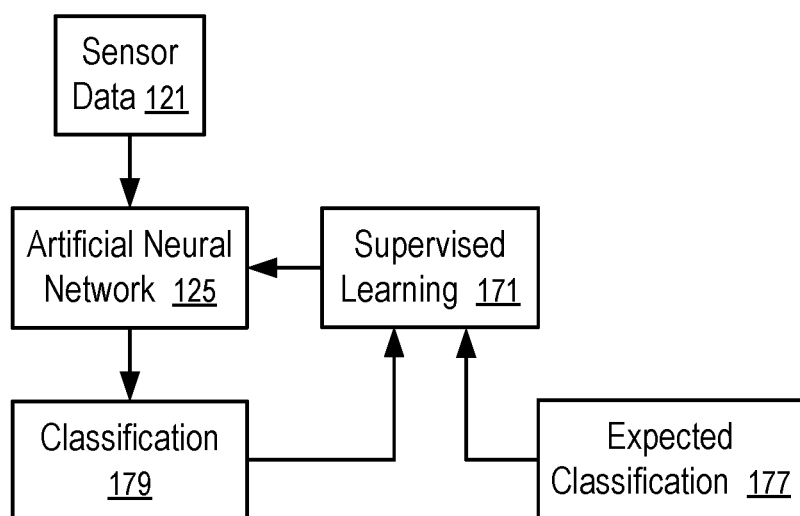

FIGS. 4-6 illustrate training of artificial neural networks (125) for prediction according to some embodiments.

In FIG. 4, a module (171) of supervised machine learning is used to train an artificial neural network (125) to minimize the differences between the prediction (129) generated from the sensor data (121) and the desired inference result data (123).

For example, the sensor data (121) can include an image showing an object; and the desired/expected inference result data (123) can identify an image region occupied by the object, a feature of the object, a classification of the object, an identity of the object, etc.

For example, the sensor data (121) can include an image surrounding of the vehicle (111); and the desired/expected inference result data (123) can include preferred control inputs for the steering control (141), the braking control (143), and the acceleration control (145).

The desired/expected inference result data (123) can be generated by a human operator. For example, the sensor data (121) can be used to construct a virtual reality demonstration of a situation encountered by the vehicle (111), including images from the image sensing device (101) showing an environment of the vehicle (111); and the desired/expected inference result data (123) can include responses generated by a human operator responsive to the virtual reality demonstration of the situation.

The supervised machine learning module (171) can adjust the artificial neural network (125) to reduce/minimize the difference between the prediction (129) generated based on the sensor data (121) and the desired/expected inference result data (123) generated by a human operator.

The supervised learning (171) of FIG. 3 can be applied in the server (119) based on the sensor data of a population of vehicles and corresponding desired/expected inference result data (123) to generate a generic ANN for the population of the vehicles.

The supervised learning (171) of FIG. 3 can be applied in the vehicle (111) based on the sensor data of the vehicle and inference result data (123) to generate a customized/personalized ANN (125). For example, a generic ANN (125) can be initially used in the vehicle (111); and the sensor data of the vehicle (111) and desired/expected inference result data (123) specific to the vehicle (111) can be used to further train the ANN (125) of the vehicle for customization/ personalization of the ANN (125) in the vehicle (111).

In FIG. 5, a module (175) of unsupervised machine learning is used to train or refine an artificial neural network (125) to facilitate anomaly detection (173). The unsupervised machine learning module (175) is configured to adjust the ANN (e.g., SNN) to generate the normal classification, clustering, or recognized patterns in the sensor data (121) such that a degree of deviation from the normal classification, clustering, or recognized patterns in the sensor data (121) can be used to signal the detection (173) of anomaly.

For example, anomaly detection (173) can be used to preserve the sensor data (121) associated with anomaly for further analysis. In response to anomaly detection (173) in the vehicle (111), the computer system (131) can issue read command to the image sensing device (101) to retrieve image data associated with the anomaly from the image sensing device (101) and store the retrieved image data in the data storage device (112). The image data associated with the anomaly can be temporarily preserved in the memory device (107) of the image sensing device (101) and loaded to the data storage device (112) over a period of time using available communication bandwidth between the image sensing device (101) and the data storage device (112) without impacting the normal operations of the ADAS (105).

When the vehicle (111) is in the maintenance service facility (127), the image data (and other sensor data) associated with the anomaly can be retrieved from the data storage device (112) to generate desired/expected inference result data (123) for further training of the ANN (125) using a supervised learning (171) of FIG. 4.

Optionally, a supervised machine learning (171) can be used to train the ANN (125), as illustrated in FIG. 6. The supervised learning (171) can be used to minimize the classification differences between the predictions (179) made using the ANN (125) according to the sensor data (121) and the expected classification (177).

For example, in absence of an accident, a near accident event, or a user input indicating an abnormal condition, a classification of "normal" can be assumed. An accident, a near accident event, or a user input can be used to identify an expected classification of "abnormal" for the sensor data leading to the accident, event, or user input. The supervised machine learning (171) can be used to train the artificial neural network (125) to make the classification (179) with reduced/minimized differences from the expected classification (177).

Optionally, the integrated image sensing device (101) can be configured to accelerate the computations of a portion of the artificial neural network (ANN) (125) implemented via the inference engine (108).

For example, the inference engine (108) can include a neural network accelerator (159) specialized to perform at least part of the computations involving the artificial neural network (ANN) (125), such as dot-product of vectors and tensors, multiply and accumulation operations, etc. Optionally, some ANN processing not involving the images generated by the image senor (109) can also be performed in the integrated image sensing device (101) (e.g., to reduce the computation load on the computer system (131) of the vehicle (111)).

The computations configured in the integrated image sensing device (101) can be used to reduce the amount of data to be transmitted to the processor(s) (133) to use or apply the ANN (125) and/or reduce the computation tasks of the processor(s) (133) in evaluating the outputs of the ANN (125) and/or in training the ANN (125). Such an arrangement can result in faster output from the integrated image sensing device (101) and/or lower energy usage, since the data would not have to be moved in and out of the integrated image sensing device (101) to a dedicated, standalone neural network accelerator. The computation capability of the integrated image sensing device (101)) in processing data related to the ANN (125) enables the computer system (131) of the motor vehicle (111) to have computational resources and communication bandwidth for mission critical tasks (e.g., autonomous driving by the ADAS (105)).

Figure 7:
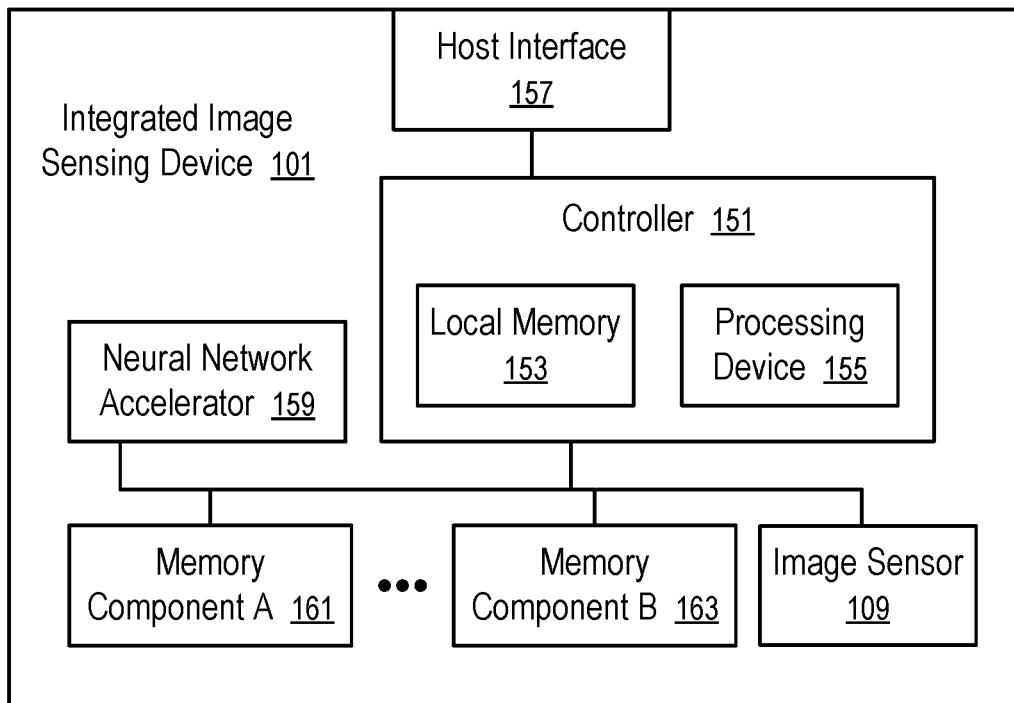
FIG. 7 shows an integrated image sensing device with a neural network accelerator according to one embodiment.

FIG. 7 shows an integrated image sensing device (101) with a neural network accelerator (159) according to one embodiment. For example, the integrated image sensing device (101) of FIG. 7 can be used to implement the image sensing device (101) of the vehicle (111) illustrated in FIG. 2 or 3.

In FIG. 7, the integrated image sensing device (101) has a host interface (157) configured to communicate with a host processor (e.g., 133 in FIG. 3) or a host system (e.g., 104 in FIG. 1). For example, the communication between the host processor (e.g., 133 or 104) and the host interface (157) can be, at least in part, in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

For example, the host interface (157) can be configured to be similar to a host interface of a data storage device (e.g., 112).

For example, the host computer system (131 or 104) can communicate with the host interface (157) to retrieve inference results generated by the integrated image sensing device (101) from the images from the image sensor (109), instead of the images, to reduce the data traffic going through the host interface (157).

Optionally, the host interface (157) can be further used to receive, in the image sensing device (101), sensor data (121) generated by other sensors of the vehicle (111); and the sensor data (121) and the images from the image sensor (109) are combined in a portion of the ANN (125) that is implemented in the integrated image sensing device (101) to generate inference results.

In FIG. 7, each of the memory components (161 to 163) can be a memory integrated circuit configured to store data. The integrated circuit dies of the memory components (161 to 163) can be stacked to the back of the image sensor (109); and through-silicon vias between the image sensor (109) and the integrated circuit dies of the memory components (161 to 163) can be used to provide high communication bandwidth for storing the images generated by the image sensor (109) into at least some of the memory components (161 to 163) for processing by the controller (151) and/or the neural network accelerator (159). For example, different sections of the image sensor (109) can store image data to different memory components (161 to 163), or different sections of a memory component (e.g., 161 or 163), using through-silicon vias.

The neural network accelerator (159) and the controller (151) can be implemented via logic circuits formed on one or more integrated circuit dies that are further stacked on the integrated circuit dies of the memory components (161 to 163). Through-silicon vias between the integrated circuit die(s) of the neural network accelerator (159) and the controller (151) and the integrated circuit dies of the memory components (161 to 163) can be used to provide high communication bandwidth for processing the images stored in the memory components (161 to 163) to generate inference results. The inference results can be stored in the local memory (153) of the controller (151) and/or some of the memory components (161 to 163) for retrieval by the host system (104), such as the computer system (131) of the vehicle (111). For example, different memory components (161 to 163), or different sections of a memory component (e.g., 161 or 163), can use through-silicon vias to facilitate parallel access for different portions of the neural network accelerator (159), the controller (151), and the image sensor (109).

In general, some memory integrated circuits are volatile and require power to maintain the stored data; and some memory integrated circuits are non-volatile and can retain the stored data even when not powered. The memory components (161 to 163) can include volatile memory and/or non-volatile memory. The memory components (161 to 163) can implement different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer is located above the memory element columns, and wires of the other lay is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The integrated image sensing device (101) can have a controller (151) that includes volatile local memory (153) and at least one processing device (155).

The local memory of the controller (151) can be an embedded memory configured to store instructions for performing various processes, operations, logic flows, and routines that control operation of the processing device (155), including handling communications between the integrated image sensing device (101) and the processor(s) (e.g., 133) of the vehicle (111), and other functions described herein. Optionally, the local memory (151) of the controller (151) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 7, the integrated image sensing device (101) includes a neural network accelerator (159) coupled to the controller (151) and/or the memory components (161 to 163).

For example, the neural network accelerator (159) can be configured to perform matrix arithmetic computations more efficiently than the processing device (155) of the controller (151). The computations involving ANN (125) have matrix multiplication and accumulation operations, which can be computational intensive for a generic processor (e.g., 133, 155). Using the neural network accelerator (159) to perform the matrix arithmetic computations can reduce the data to be transmitted to the processor(s) (133) of the vehicle (111) and reduce the computation workload for the processor(s) (133, 155).

When the ANN (125) includes a Spiking Neural Network (SNN), the simulation of the differential equation(s) for controlling the activation level of SNN neurons can be computationally intensive for a generic processor (e.g., 133, 155). Optionally, the neural network accelerator (159) can use special hardware to simulate the differential equation(s) and thus improve the computational efficiency in implementing the SNN.

In some implementations, the neural network accelerator (159) is an integrated circuit device separate from the controller (151) and/or the memory components (161 to 163). Alternatively, or in combination, a neural network accelerator (159) is integrated with the controller (151) in an integrated circuit die. Alternatively, or in combination, a portion of the neural network accelerator (159) can be integrated on the integrated circuit die(s) of at least one of the memory components (161 to 163), as illustrated in FIG. 8.

Figure 8:
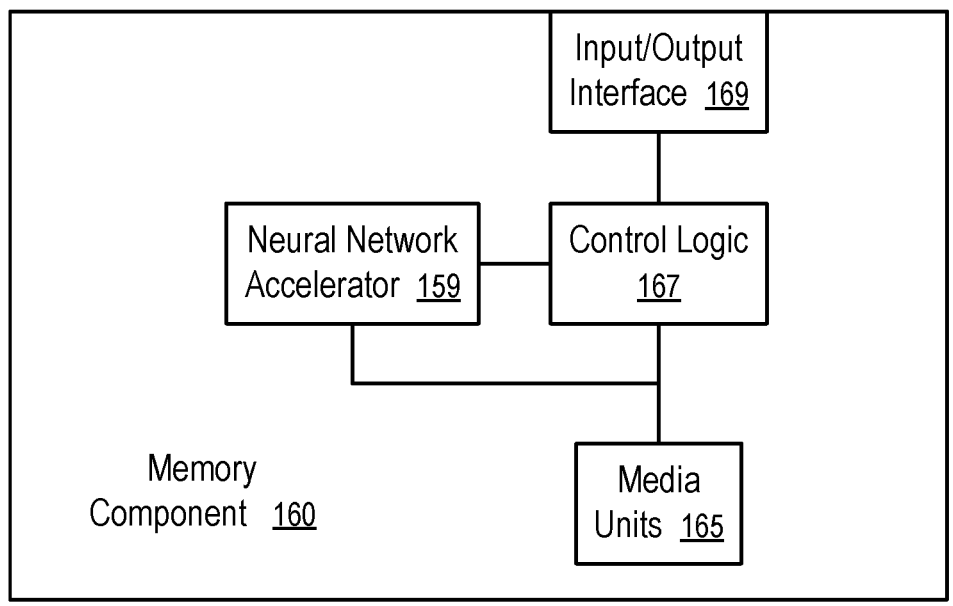
FIG. 8 shows a memory component to accelerate neural network computations according to one embodiment.

FIG. 8 shows a memory component (160) to accelerate neural network computations according to one embodiment. For example, each or some of the memory components (161 to 163) in FIG. 7 can be implemented using a memory component (160) of FIG. 8.

In FIG. 8, the memory component (160) can be formed on an integrated circuit die. An input/output (I/O) interface (169) of the memory component (160) is configured to process input/output signals for the memory component (160). For example, the input/output signals can include address signals to specify locations in the media units (165) and data signals representing data to be written in the media units (165) at the locations specified via the address signals, or data retrieved from the locations in the media units (165).

In FIG. 8, a neural network accelerator (159) is coupled with the control logic (167) and/or the media units (165) to perform computations that are used in the evaluation of the output of a portion of an ANN (125) and/or in the training of the ANN (125).

For example, the input/output interface (169) can receive addresses that identify matrices that are stored in the media units and that are to be operated upon via the neural network accelerator (159). The memory component (160) can provide the computation results of the neural network accelerator (159) as the output data responsive to the addresses, store the output data in a buffer for further operations, store the output data into a location in the media units (165) specified via the address signals. Thus, the computations performed by the neural network accelerator (159) can be within the memory component (160), which is close to the media units (165) in which the matrix data is stored.

For example, the state data of SNN neurons can be stored in the media units (165) according to a predetermined pattern. The neural network accelerator (159) can automatically update the states of the SNN neurons according to the differential equation(s) for controlling the activation level of SNN neurons over time. Optionally, the neural network accelerator (159) is configured to process spiking of neurons in the neural network. Alternatively, the neural network accelerator (159) of the integrated image sensing device (101) and/or the processor(s) (133) can be configured to process the spiking of neurons and/or accumulation of inputs to the SNN.

For example, the image sensor (109) generates images at a predetermined frequency. Each image is stored into the memory components (161 to 163) in a cyclic way where the newest image writes over the oldest image. The memory components (161 to 163) further store a portion of ANN (125) of the vehicle (111) responsible for processing of the images from the image sensor (109). The controller (151) processes the images in the memory components (161 to 163) according to the portion of ANN (125) to generate inference results. The inference results are stored in the memory components (161 to 163) and/or in the local memory (153) of the controller (151) for reading by the host system (104), such as the computer system (131) of the vehicle (111).

Optionally, the integrated image sensing device (101) further receives a sensor data stream from at least one sensor configured on the vehicle (111) and generate the inference results based on the sensor data stream and the images from the image sensor (109) according to the portion of ANN (125) stored in the memory components (161 to 163).

A neural network accelerator (159) configured within the integrated image sensing device (101) performs at least a portion of computations based on an artificial neural network (125), the images from the image sensor (109), and the sensor data stream.

Optionally, the neural network accelerator (159) can be configured on an integrated circuit die that is separate from a controller (151) and/or separate from the memory components (161 to 163).

Optionally, the neural network accelerator (159) can be configured on an integrated circuit die that includes a controller (151) of the integrated image sensing device (101), or memory component (160, 161 or 163) of the integrated image sensing device (101).

The neural network accelerator (159) can be configured to perform computations, such as matrix arithmetic computations for ANN and/or or differential equation simulations for SNN, using data stored in the integrated image sensing device (101).

Examples of the matrix arithmetic computations include matrix multiplication and accumulation operations. After a computation to generate a result of the matrix arithmetic computations using a data stored in the integrated image sensing device (101), the neural network accelerator (159) can provide the result as output of the integrated image sensing device (101) in data retrieval operations (e.g., in response to a read command). Alternatively, or in combination, the result of the matrix arithmetic computation can be buffered in the integrated image sensing device (101) as operand for a next matrix computation performed in combination with a matrix of data retrieved from the non-volatile memory via a read command received in the host interface (157).

When the Artificial Neural Network (ANN) (125) includes a Spiking Neural Network (SNN), the neural network accelerator (159) can be configured to simulate a differential equation controlling activation levels of neurons in the Spiking Neural Network (SNN). Optionally, the memory component (160) is configured to store states of the neurons in the spiking neural network according to a predetermined pattern; and the neural network accelerator is configured to automatically update the states of the neurons over time according to the differential equation. For example, the neural network accelerator (159) can be configured to train the Spiking Neural Network (SNN) via unsupervised machine learning to detect anomaly.

The computations performed by the neural network accelerator (159) according to an Artificial Neural Network (ANN) (125) involve different types of data that have different patterns of usages of the integrated image sensing device (101).

For example, making a prediction using the Artificial Neural Network (ANN) (125) includes the use of data specifying the model of the Artificial Neural Network (ANN) (125), input data provided to the artificial neurons, and output data generated by the artificial neurons.

The memory capacity of the integrated image sensing device (101) can be partitioned into different portions for the different types of ANN-related data. The different portions can be separately configured to optimize the access and storage of the corresponding data according to their patterns of usages by the neural network accelerator (159) and/or the processor(s) (133) of the computer system (131) in which the integrated image sensing device (101) is configured.

The model of the Artificial Neural Network (ANN) (125) can include the parameters specifying the static attributes of individual artificial neurons in the ANN (125) and the neuron connectivity in the ANN (125). The model data of the ANN (125) is static and does not change during the prediction calculation made using the ANN (125). Thus, the usage pattern of the model data is mostly read. However, the model data of the ANN (125) can change when an updated ANN (125) is installed. For example, the vehicle (111) can download an updated ANN (125) from the server (119) to the integrated image sensing device (101) of the vehicle (111) to update its prediction capability. The model data of the ANN (125) can also change during or after the training of the ANN (125) using a machine learning technique (e.g., 171 or 175). It is preferred to configure a memory separate partition or region of the integrated image sensing device (101) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (125) can include external inputs and internal inputs. The external inputs are generated typically by the sensors (e.g., 109) of the vehicle (111) but not by artificial neurons in the ANN (125). The external inputs can be saved in a cyclic fashion so that the input data of the most recent time period of a predetermined length of driving can be found in the integrated image sensing device (101). Thus, it is preferred to configure a separate memory partition or region of the integrated image sensing device (101) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (125) can be buffered for further access by the neural network accelerator (159) and/or the processor(s) (133) of the computer system (131). The output data can include external outputs and internal outputs. The external inputs are generated by artificial neurons as the output from the ANN (125), such as the results of classifications or predictions made by the ANN (125). The output of the ANN (125) is typically further processed by the processor(s) (133) of the computer system (131). The external inputs may be saved periodically (e.g., in a way similar to the storing of the state variable data). The internal outputs and/or some of the external outputs can be internal inputs to artificial neurons in the ANN (125). In general, it may not be necessary to store the internal outputs from the buffer of the data storage device to the memory components. In some implementations, when the buffer capability of the integrated image sensing device (101) is insufficient to hold the entire state variable data and/or the internal outputs, the integrated image sensing device (101) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the integrated image sensing device (101). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 9:
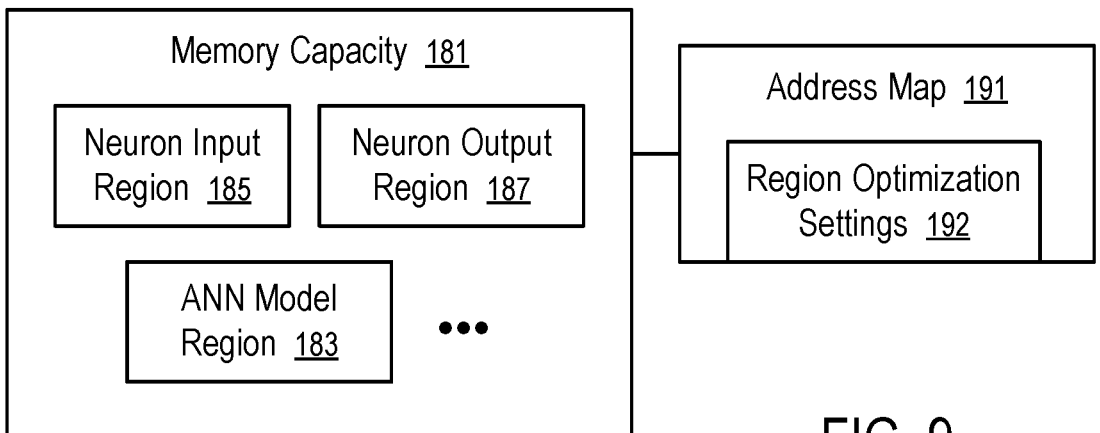
FIG. 9 shows a memory capacity configured to support neural network computations according to one embodiment.

FIG. 9 shows a memory capacity (181) configured to support neural network computations according to one embodiment. For example, the memory capacity (181) of the memory components (161 to 163) of the integrated image sensing device (101) of FIG. 7 can be configured according to FIG. 9 to support neural network computations.

The storage capacity (181) of FIG. 9 can be implemented using a set of memory components (e.g., 161 to 163) of the integrated image sensing device (101).

A set of regions (183, 185, 187, . . . ) can be created on the storage capacity (181) of the integrated image sensing device (101). Each of the region (e.g., 183, 185, or 187) corresponds to a named portion of the storage capacity (181). Logical addresses are defined within each region. An address map (191) is configured to map between the logical addresses defined in the regions (183, 185, 187, . . . ) to the physical addresses of memory units in the memory components (e.g., 161 to 163 illustrated in FIG. 7).

The address map (191) can include region optimization settings (192) for the regions (183, 185, and 187).

For example, an ANN model region (183) can be a memory/storage partition configured for the model data of the Artificial Neural Network (ANN) (125). The region optimization settings (192) optimizes the memory operations in the ANN model region (183) according to the data usage pattern of ANN models (e.g., mostly read, infrequent update centric).

For example, a neuron input region (185) can be a memory/storage partition configured for the external input data to the Artificial Neural Network (ANN) (125). The region optimization settings (192) optimizes the memory operations in the neuron input region (185) according to the data usage pattern of the external input data (e.g., for enhanced endurance supporting cyclic overwrite of continuous input data flow for sequential writes).

For example, a neuron output region (187) can be a memory/storage partition/configured for the external output data provided from the Artificial Neural Network (ANN) (125). The region optimization settings (192) optimizes the memory operations in the neuron output region (187) according to the data usage pattern of the external output data (e.g., improved endurance for periodically overwrite of data with random read/write access).

The integrated image sensing device (101) includes a buffer configured to store temporary/intermediate data of the Artificial Neural Network (ANN) (125), such as the internal inputs/outputs of the artificial neurons in the ANN (125).

Optionally, a swap region can be configured in the storage capacity (181) to extend the capacity of the buffer (152).

Optionally, the address map (191) includes a mapping between logic memory addresses received in the host interface (157) to access data of artificial neurons and the identities of the artificial neurons. Thus, a read or write command to access one type of data of an artificial neuron in one region can cause the controller 151 to access another type of data of the artificial neuron in another region.

For example, in response to a request to write external input data for a neuron into the storage capacity (181) of the data storage device (185), the address map (191) can be used to calculate the addresses of the model parameters of the neuron in the ANN model region (183) and read the model parameters into the buffer (152) to allow the neural network accelerator (159) to perform the computation of the output of the neuron. The output of the neuron can be saved in the buffer (152) as the internal input to other neurons (e.g., to reduce write amplification). Further, the identities of the other neurons connected to the neuron can also be retrieved from the ANN model region (183) into the buffer (152), which allows the neural network accelerator (159) and/or the processor to further process the propagation of the output in the ANN (125). The retrieval of the model data from the ANN model region (183) can be performed in parallel with the storing of the external input data into the neuron input region (185). Thus, the processors (133) of the computer system (131) of the vehicle (111) do not have to explicitly send in read commands for the retrieval of the model data from the ANN model region (183).

Similarly, in response to reading output data of a neuron, the address map (191) can be used to compute the addresses of the model parameters of the neuron stored in the ANN model region (183) and read the model parameters into the buffer (152) to allow the neural network accelerator (159) to apply internal inputs in the buffer (152) to the perform the computation of the output of the neuron. The computed output can be provided as a response to the reading of the output data for the neuron, without the integrated image sensing device (101) having to store the output data in the memory components (e.g., 161 to 163). Thus, the processors (133) and/or the neural network accelerator (159) can control the computations of the neuron via writing inputs to neurons and/or reading outputs from neurons.

In general, incoming external input data to the ANN (125) can be raw sensor data (121) generated directly by the sensors (e.g., 109) without processing by the processors (133) and/or the neural network accelerator (159). Alternatively, indirect sensor data (121) that has processed by the processors (133) for the ANN (125) from the signals from the sensors (101) can be provided as the external input data. The incoming external input data can be accepted in the host interface (157) and written in a cyclic way into the neuron input region (185), and automatically buffered in the buffer (152) for neural network accelerator (159) to generate neuron outputs using the model stored in the ANN model region (183). The outputs generated by the neural network accelerator (159) can be further buffered as internal inputs for further application of the model in the ANN model region (183). When the external outputs become available, the integrated image sensing device (101) can report the completion of the write requests with an indication of the availability of the external outputs. Optionally, the controller (151) and/or the neural network accelerator (159) can generate internal read commands to propagate signals in the ANN (125) in generating the external outputs. Alternatively, the host processors (133) can control the propagation of signals in the ANN (125) by selectively reading outputs of neurons; and the integrated image sensing device (101) can actively buffer data that may be needed in the buffer (152) to accelerate the ANN computation.

Figures 10, 11:
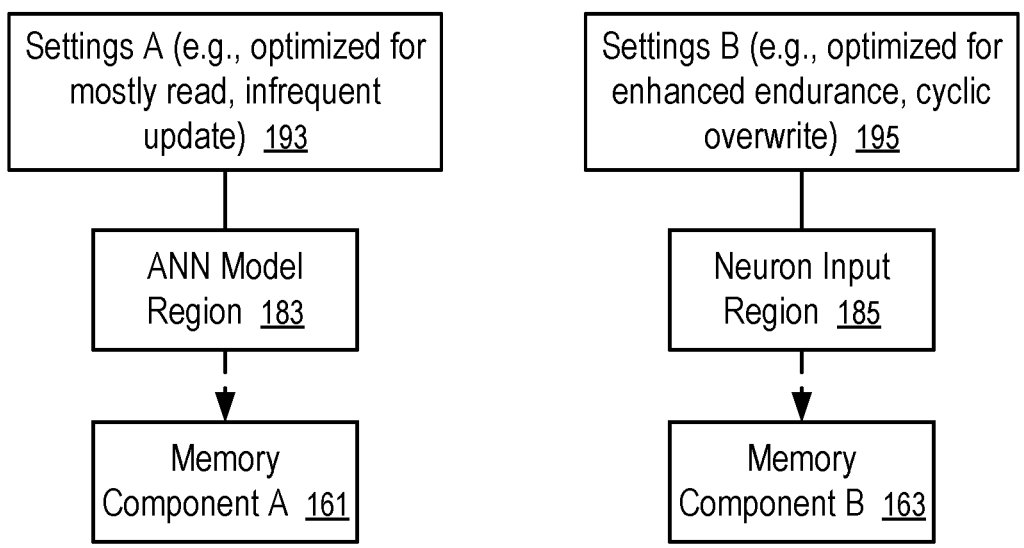
FIG. 10 illustrates the configuration of a memory region for an Artificial Neural Network (ANN) model according to one embodiment.
FIG. 11 illustrates the configuration of a memory region for the inputs to artificial neurons according to one embodiment.

FIG. 10 illustrates the configuration of a memory region (183) for an Artificial Neural Network (ANN) model according to one embodiment. For example, the configuration of FIG. 10 can be implemented in the integrated image sensing device (101) of FIG. 7 with a logical memory capacity (181) of FIG. 9. For example, the settings (193) of FIG. 10 can be part of the region optimization settings (192) of FIG. 9.

The configuration of FIG. 10 maps an ANN model region (183) to at least one memory component A (161). Preferably, the at least one memory component A (161) can be used by the controller (151) in parallel with memory components (e.g., 163) that hosts the other regions (e.g., 185 and 187) of ANN data. For example, the memory component A (161) can be in an integrated circuit package that is separate from the integrated circuit packages for the other regions (e.g., 185 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 10, the settings (197) are optimized to the usage pattern of mostly read and infrequent update.

FIG. 11 illustrates the configuration of a region (185) for the inputs to artificial neurons according to one embodiment. For example, the configuration of FIG. 10 can be implemented in the integrated image sensing device (101) illustrated in FIGS. 7 and/or 9. For example, the settings (195) of FIG. 10 can be part of the region optimization settings (192) of FIG. 9.

The configuration of FIG. 11 maps a neuron input region (185) to at least one memory component B (163). Preferably, the at least one memory component B (163) can be used by the controller (151) in parallel with memory components (e.g., 161) that hosts the other regions (e.g., 183 and 187) of ANN data. For example, the memory component B (163) can be in an integrated circuit package that is separate from the integrated circuit packages for the other regions (e.g., 183 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 11, the settings (197) are optimized to the usage pattern of enhanced endurance in cyclic sequential overwrite in recording a continuous stream of input data that is sampled at a fixed time interval.

Figure 12:
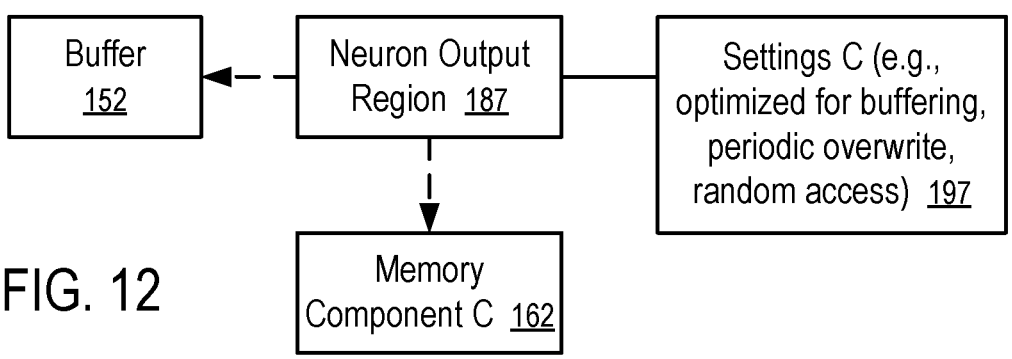
FIG. 12 illustrates the configuration of a memory region for the outputs from artificial neurons according to one embodiment.

FIG. 12 illustrates the configuration of a region (187) for the outputs from artificial neurons according to one embodiment. For example, the configuration of FIG. 10 can be implemented in the integrated image sensing device (101) illustrated in FIGS. 7 and/or 9. For example, the settings (197) of FIG. 10 can be part of the region optimization settings (192) of FIG. 9.

The configuration of FIG. 12 maps a neuron output region (187) to at least one memory component C (162). Preferably, the at least one memory component C (162) can be used by the controller (151) in parallel with memory components (e.g., 161 and 163) that hosts the other regions (e.g., 183 and 185) of ANN data. For example, the memory component C (162) can be in an integrated circuit package that is separate from the integrated circuit packages for the other regions (e.g., 183 and 185). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 12, the settings (197) are optimized to the usage pattern of buffered data for periodic overwrite with random access. For example, memory units are configured via the optimization settings (193 to 197) to update/overwrite in the neuron output region (187) at a frequency higher than in the ANN model region (183), but lower than in the neuron input region (185).

A communication protocol/interface can be configured to allow an integrated image sensing device to perform neural network acceleration on the fly with reduced data traffic to the host system (104).

For example, the host processor (e.g., 133) of a vehicle (111) can provide write commands to the integrated image sensing device (101) to store the model of an artificial neural network in a model partition (e.g., 183).

To use the ANN model in classifications and/or predictions, the host processor (e.g., 133) of a vehicle (111) can optionally stream input data for the ANN (125) into the neuron input partition (e.g., 185). The neural network accelerator (159) of the storage device (112) can automatically apply the images from the image sensor (109) and, if there is any, the input data from the host processor (133) to the model stored in ANN model partition (e.g., 183) in accordance with the address map (191). The integrated image sensing device (101) makes the computed outputs available for propagation in the ANN (125). Preferably, the computed outputs are made available to the neural network accelerator (159) through the buffer (152) without the need to store the intermediate outputs into memory components (e.g., 161 to 163). Thus, the data communications between the host processor (e.g., 133) and the integrated image sensing device (101) for the transporting of outputs of neurons can be reduced. When the outputs have propagated to the output neurons in the ANN (125), the integrated image sensing device (101) can provide a response to a request from the host processor (e.g., 133). The response indicates that the external output from neurons in the ANN (125) is available. In response, the host processor (e.g., 133) of a vehicle (111) can optionally issue read commands to retrieve the external outputs for further processing.

Figure 13:
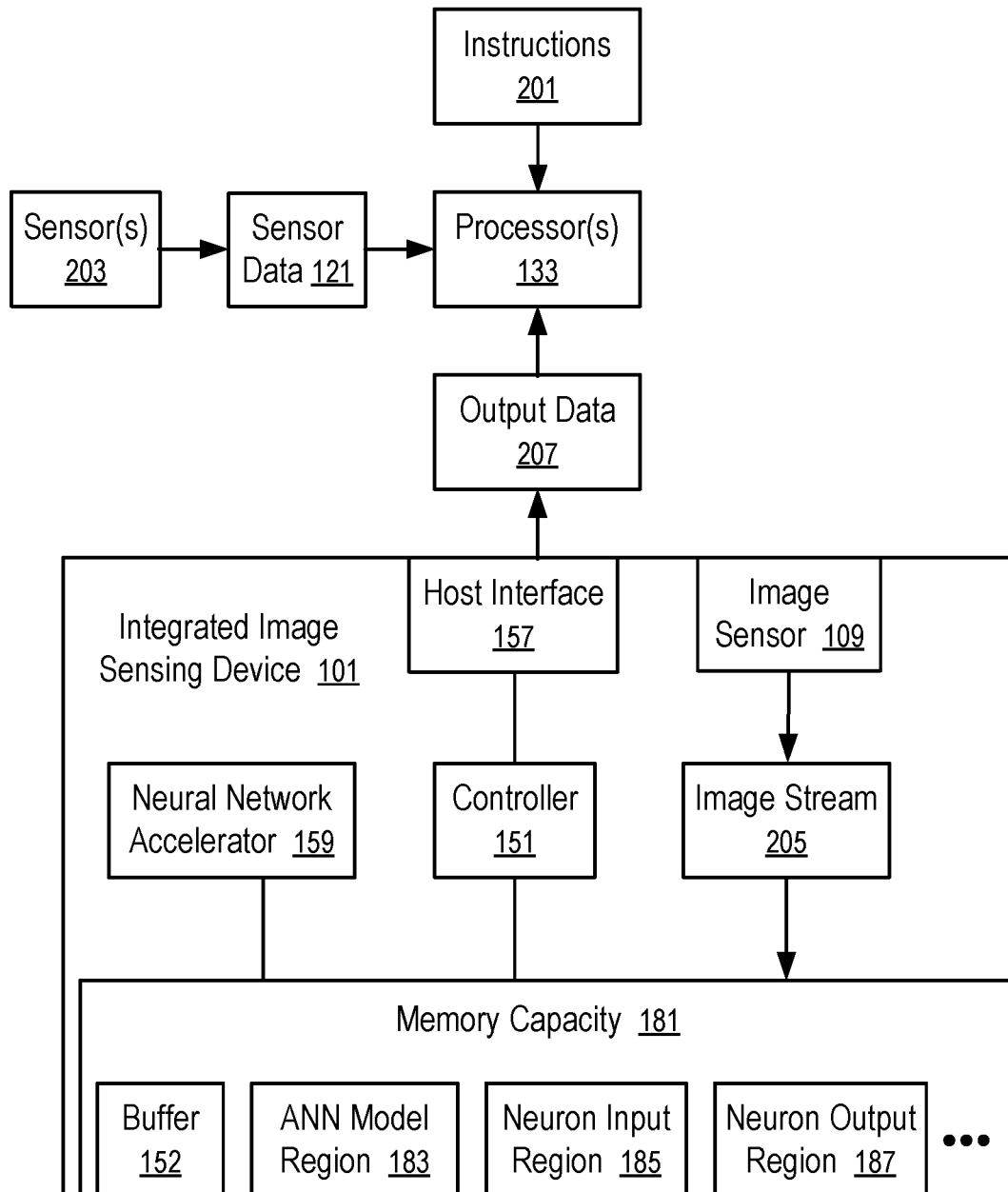
FIG. 13 shows communications between a host system and an integrated image sensing device according to one embodiment.

FIG. 13 shows communications between a host system (e.g., 104) and an integrated image sensing device (101) according to one embodiment. For example, the communications as illustrated in FIG. 13 can be implemented in the vehicle (111) of FIG. 2 or 3, with an integrated image sensing device (101) illustrated in FIG. 1, or 7.

In FIG. 13, the processor(s) (133) of the host system (e.g., 104) can be configured with a simplified set of instructions (201) to perform neural network computation, since some of the computations involving the ANN (125) is performed by the neural network accelerator (159) within the integrated image sensing device (101). It is not necessary to transport the image stream (205) and the model data back to the processor(s) (133) during the use of the ANN (125) for predictions and/or classifications.

The image sensor (109) can generate a continuous image stream (205) as part of sensor data (121) for the vehicle (111). The images in the stream (205) can be generated at a fixed, predetermined time interval (e.g., during the operation of the vehicle (111)).

The image stream (205) is applied to input neurons in the ANN (125). Input neurons in the ANN (125) are configured to accept external inputs to the ANN (125); and output neurons are configured to provide external outputs from the ANN (125).

Optionally, the vehicle (111) can have further sensor(s) (203) configured to generate sensor data (121).

The processor(s) (133) can execute the instructions (201) to process the output data (207) from the integrated image sensing device (101) and the sensor data (121).

Optionally, the processor(s) (133) can write the sensor data (121) into the neuron input region (185) to obtain the output data (207) that is based on both the sensor data (121) and the image stream (205).

The integrated image sensing device (101) stores the image stream (205) (and optionally the sensor data (121)) into the neuron input region (185) in a cyclic way where the oldest input set corresponding to the oldest time instance of data sampling for data sets currently stored in the neuron input region (185) is erased to store the newest set of inputs.

For each input data set, the neural network accelerator (159) applies the model of the ANN (125) stored in the ANN model region (183). The neural network accelerator (159) (or the processor(s) (133)) can control the propagation of signals within the neural network. When the output neurons of the ANN (125) generate their outputs responsive to the input data set, the integrated image sensing device (101) can provide to the processor (133) an indication that the neuron output are ready for retrieval. The indication can be configured in a response to the request from the processor(s) (133) to write the input data set into the neuron input region (185). The processor(s) (133) can optionally retrieve the output data (207) (e.g., in accordance with conditions and/or criteria programmed in the instructions).

In some embodiments, a trigger parameter is configured in the integrated image sensing device (101). When an output parameter in the external output (217) meetings a requirement specified by the trigger parameter, the data storage device provides the response to the request from the processor(s) (133) to write the input data set into the neuron input region (185).

Figure 14:
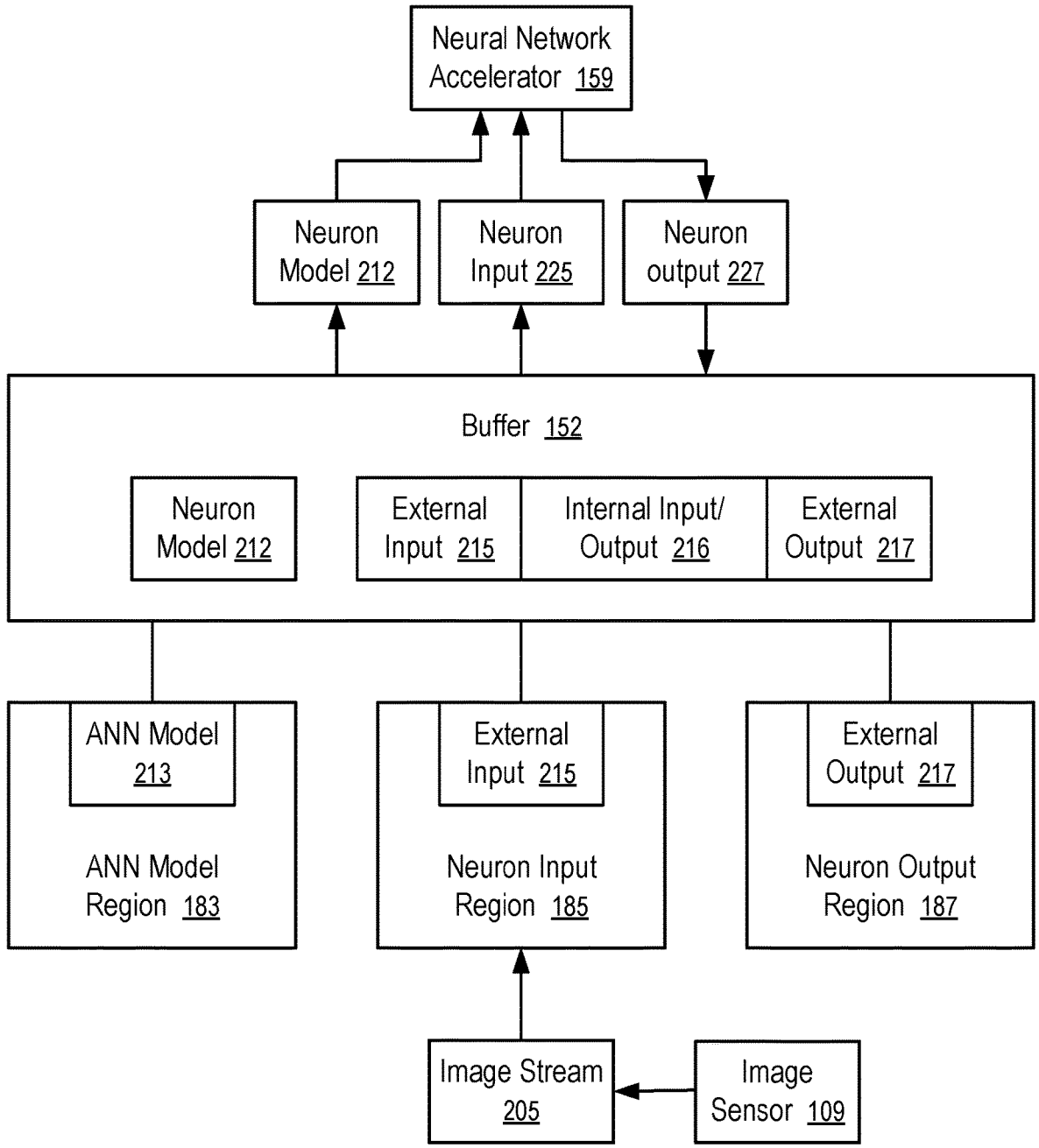
FIG. 14 shows communications within an integrated image sensing device according to one embodiment.

FIG. 14 shows communications within an integrated image sensing device (101) according to one embodiment. For example, the communications of FIG. 14 can be implemented an integrated image sensing device (101) illustrated in FIG. 1 or 7, in connection with the communications with the host system (104) as illustrated in FIG. 1.

In FIG. 14, the model region (183) stores the model (213) of an ANN (125). In response to receiving a set of external input (215) for a time instance from the input stream (205) in the buffer (152), the integrated image sensing device (101) can write the external input (215) into the input region (185) in parallel with retrieving a neuron model (212) containing a portion of the ANN model (213) corresponding to the parameters of the input neurons and/or the identities of neurons connected to the input neurons. The buffer (152) allows the neural network accelerator (159) to combine the neuron model (212) and the external input (225) to generate the output (227) of the input neurons.

In general, the neuron output (227) can include a portion that is the internal output (216) for further propagation within the ANN (125) and/or a portion that is the external output (217) for the processor(s) (133).

The internal output (216) is stored in the buffer (152) as internal input (216) for further propagation in the ANN (125) in a way similar to the generation of neuron outputs (227) from the external input (215). For example, a portion of the internal input (216) can cause the controller (151) and/or the neural network accelerator (159) to retrieve corresponding neuron model (212) relevant to the internal input such that the internal input is applied in the neural network accelerator (159) to the corresponding neuron model (212) to generate their neuron outputs (227).

When the complete set of external output (217) is available in the buffer (152), the external output (217) can be stored into the output region (187).

Optionally, the storage device (112) does not store each set of external output (217) corresponding to a set of stored external input (215) sampled at a time instance. For example, the storage device (112) can be configured to store one set of external output (217) every time when a predetermined number of sets of external input (e.g., 215) has been counted. Alternatively, or in combination, the processor(s) (133) can determine whether or not to store the external output (217). For example, the storage device (112) can be configured to store the external output (217) in response to the processor(s) (133) retrieving the external output (217) for further processing. For example, the storage device (112) can be configured to store the external output (217) in response to a write command from the processor(s) (133) after the processing of the external output (217) in the processor(s) (133).

Figure 15:
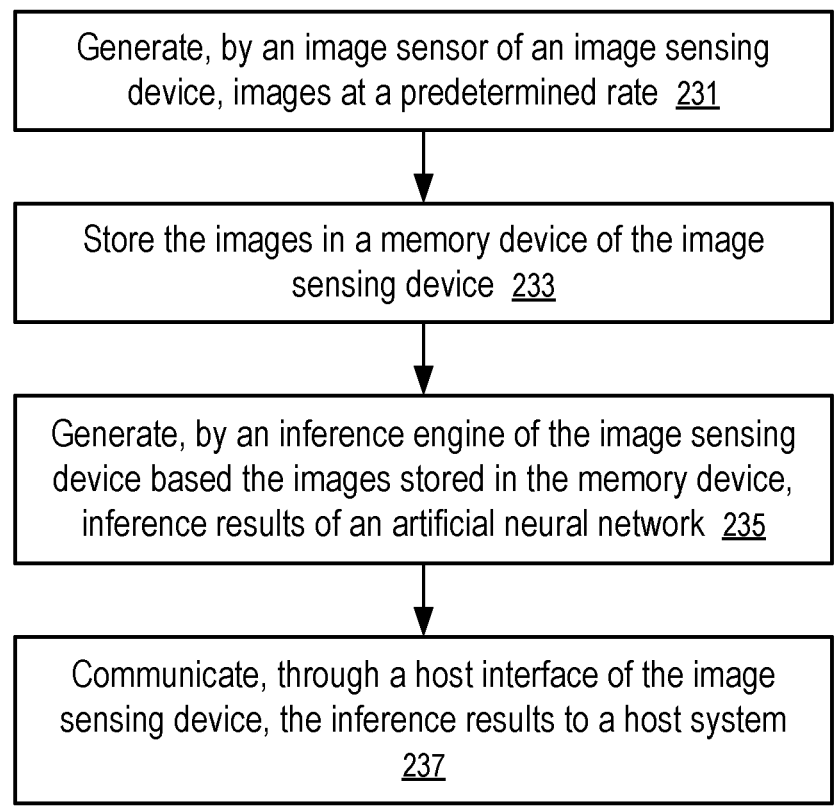
FIG. 15 shows a method implemented in an integrated image sensing device according to one embodiment.

FIG. 15 shows a method implemented in an integrated image sensing device according to one embodiment. For example, the method of FIG. 15 can be implemented in an integrated image sensing device (101) of FIG. 1 or 7 in connection with a host system (104) of FIG. 1 or a computer system (131) or ADAS (105) of FIG. 3 in a vehicle (111) of FIG. 2 or 3.

At block 231, an image sensor (109) of an image sensing device (101) generates images at a predetermined rate.

At block 233, the images are stored in a memory device (107) of the image sensing device (101).

At block 235, an inference engine (108) of the image sensing device (101) generates, based the images stored in the memory device (107), inference results of an artificial neural network (125).

At block 237, the inference results are communicated to a host system (e.g., 104, 131) through a host interface (106 or 157) of the image sensing device (101).

Since the data size of the inference results is much smaller than the data size of the corresponding images, the predetermined rate of images generated by the image sensor (103) can exceed a communication bandwidth between the image sensing device (101) and the host system (e.g., 104, 131).

Optionally, the image sensing device (101) can receive sensor data (121) through the host interface (106 or 157) from the host system (e.g., 104 or 131). The inference results can be generated based on both the sensor data from the host system (e.g., 104, 131) and the images from the image sensor (109).

Optionally, the host system (e.g., 104 or 131) can request the image sensing device (101) to transmit one or more images corresponding to selected inference results that are generated from the requested images. The selected images can be portions of original images generated by the image sensor, or images with reduced resolution in certain areas, or the original images from the image sensor (109).

The image sensor (109) can generate images and store the images into a predefined portion of the memory device cyclically by replacing an oldest image stored in the portion with a newest image generated by the image sensor (109).

The image sensor (109) can be formed on a first integrated circuit die; and the memory units of the memory device (107) and the logic circuits of the inference engine (108) can be formed on one or more second integrated circuit dies. The one or more second integrated circuit dies can be stacked on the first integrated circuit die to form a three dimensional integrated circuit (3D IC). In the 3D IC, the one or more second integrated circuit dies can be connected to the first integrated circuit die by Through-Silicon Vias (TSVs) to provide high communication bandwidth among the image sensor (109), the memory device (107) and the inference engine (108) (e.g., higher than the communication bandwidth of the host interface (e.g., 106 or 157).

Optionally, the 3D IC can include a host/communication interface (106, 157) of a ball grid array solid state drive (BGA SSD) and be configured as one integrated circuit package. For example, the host/communication interface (106, 157) can be configured to communicate in accordance with a serial communication protocol, such as a protocol in accordance with a standard for a Peripheral Component Interconnect express (PCIe) bus, a Serial Advanced Technology Attachment (SATA) bus, or a Universal Serial Bus (USB) bus.

For example, the host interface (106, 157) can be configured to receive commands to store sensor data into a portion of the memory units of the memory device (107) of the integrated image sensing device (101); and in response, the inference engine (108) can be configured to generate inference results based on applying, to the artificial neural network (125), both the sensor data received via the host interface (106, 157) and the images generated by the image sensor (109).

In a typical operation, the inference engine (108) is configured to process the images from the image sensor (109) according to an artificial neural network (125) and generate inference results as output (207) of the image sensing device (101).

Optionally, the logic circuits of the inference engine (108) include a neural network accelerator (159) configured to perform matrix arithmetic computations for data stored in the memory units. For example, the matrix arithmetic computations can include matrix multiplication and accumulation operations.

For example, the image sensing device (101) can be configured in a vehicle (111) having an advanced driver assistance system (105) connected to the host/communication interface (106, 157) of the image sensing device through a communication connection. At least a portion of an artificial neural network (125) of the advanced driver assistance system (105) can be implemented in the image sensing device (101) using the inference engine (108). For example, the inference engine (108) can be configured to process images from the image sensor (109) and generate inference results that are communicated through the communication connection to the advanced driver assistance system (105). The inference engine (108) can processes the images generated by the image sensor (109) at a rate that exceeds the communication bandwidth of the communication connection from the host/communication interface (106, 157) to the advanced driver assistance system (105).

Optionally, the vehicle (111) can have one or more sensors that are separate from the image sensing device. The sensor data from the one or more sensors can be written into the image sensing device (101) via the communication connection to generate the inference results based on both the sensor data and the images. The inference results can be further processed by the advanced driver assistance system (105) to generate input signals for a control for steering (141), braking (143), or acceleration (145), or any combination thereof.

The server (119), the computer system (131), the host system (104), the data storage device (112), and/or the integrated image sensing device (101) can each be implemented as one or more data processing systems.

Various additional embodiments related to intelligent image sensing systems that include a memory device with an inference engine to reduce data transmission to a host system are now described below. The generality of the following description is not limited by the various embodiments described above.

At least some embodiments below relate to an intelligent image sensing system that includes a memory device. The memory device may store sensor data and results from processing the sensor data that are used by a host system (e.g., a computing device of an autonomous vehicle, or a computing device that accesses data stored in the memory device). In one embodiment, the memory device processes the sensor data as input to an ANN, and sends output from the ANN to the host system. In one example, the memory device is a solid state drive mounted in an electric vehicle, and the host system is a controller of a vehicle component (e.g., a braking system).

In prior sensing systems, sensor data is typically sent to a central processing unit (CPU) for processing. Data from an image sensor, for example, may be generated at several megabytes per frame and several frames per second. This amount of data per sensor, multiplied by the number of sensors in the system, can overwhelm the bandwidth of communication links between the sensors and the CPU, and can overwhelm the ability of the CPU to process the data. Also, systems may have a variety of different types of sensors, with a variety of different data output formats. It may be difficult to correlate data from one type of sensor (e.g., an image sensor) with data from other types of sensors (e.g., lidar, radar, or sonar).

Various embodiments described below provide a sensor that includes a memory device with neural networking capability. The memory device can perform machine learning analytic functions (e.g., image classification, object detection, pixel segmentation, etc.) on the sensor data and generate inference results. Processing the sensor data within the sensor may reduce the amount of data transmitted to the CPU and reduce the processing load on the CPU, freeing up CPU processing power for other tasks.

At least some embodiments described below also provide the converting of non-image sensor data output into an image form. Converting non-image sensor data into image form may simplify correlating data from more than one sensor. In one example, accuracy, reliability, flexibility, and redundancy of sensor data may be improved when sensor output format is converted to image form.

In one embodiment, a memory device is used in a system with an image sensor and incorporates neural network analysis capability. The memory device is stacked with the image sensor to perform analytics at the image sensor to reduce traffic upstream, thereby enabling higher frames per second. In one example, this intelligent memory device enables ADAS or autonomous systems that have increased analytics capability, but at a reduced power consumption.

In one example, the image sensor(s) of the system are in a camera (e.g., a camera used in automotive or other applications) that generates millions of pixels per frame, and several frames per second. The memory device includes a built-in neural network capability (e.g., native logic or CMOS under array that is stacked with the image sensor(s)) for processing the data as it is captured, and sending only post-processed information upstream (e.g., to a host controller of an automobile). This enables a CPU and/or GPU of the system to perform other critical parameters without a heavy processing burden from processing the sensor data from, for example, the camera. The benefits provided by the system include increased frames per second, and lower power and cost.

In one embodiment, the memory device has logic built-in to perform several machine learning analytics such as image classification, object detection, and/or pixel segmentation (e.g., as needed in ADAS/autonomous systems). In one example, the machine learning analytics are implemented using an ANN with a neuron model stored in the memory device.

In one embodiment, the memory device is a purpose-built wide-I/O memory that provides high bandwidth optimized for machine learning tasks. This provides lower power, lower cost, and higher processing capability (e.g., higher frames per second). In one example, the memory device is an SDRAM device with 4 or 8 64-bit wide channels using direct chip-to-chip attach methods (e.g., used for between 1-4 memory chips and a controller/buffer device). In one example, the wide I/O memory interface provides memory bandwidth greater than 20 GBps. In one example, the memory device is stacked on an SOC, and the memory device and SOC are encapsulated by package molding.

In one embodiment, sensor data collected in a non-image form is converted to data in an image form using an image converter and artificial intelligence (AI) capability. Input data from one or more sensors is converted into images for further processing in an ANN. For example, sound signals captured by a microphone are converted to an image stream (e.g., spectrogram) for further analysis. In one example, data from radar, lidar, and sonar sensors can be converted to generate image data (e.g., images, or an image stream). The converter can be configured with integrated memory, ANN processing logic, and an SSD host interface, such that the converter locally processes its image data and stores the neuron outputs for access by other AI-capable devices and/or a host system. The addition of such converters in a network of AI-capable devices provides flexibility and improvement in redundancy, reliability, computational capability, and/or accuracy.

In one embodiment, a system includes a first sensor that generates first data. A memory device stores the generated first data, and further stores a first portion of an artificial neural network (ANN). A host interface of the system is configured to communicate with a host system that stores a second portion of the ANN. In one example, the memory device is stacked with the first sensor, and the memory device comprises an inference engine configured to generate inference results using the stored first data as input to the first portion of the ANN. The host interface is further configured to send the inference results to the host system for processing by the host system using the second portion of the ANN.

In one embodiment, the first sensor is an image sensor, and the first data is first image data. The system further includes a first sensing device that packages both the image sensor and the memory device. A second sensing device of the system sends second image data to the first sensing device. The second sensing device includes a second sensor configured to generate sensor data in a form (e.g., sound data) other than an image form. The second sensing device further includes a controller to convert the sensor data from its original form (e.g., sound data) to the form of the second image data.

In one example, sensor data in its original form is a time domain signal, and a converter transforms the time domain signal to spatial domain data. In one example, the original form of sensor data is represented as frequency intensity versus time, and the sensor data is converted to a two-dimensional image representation with each position of the image having a value (e.g., color) corresponding to frequency intensity. In one example, the sensor data is converted to a spectrogram (e.g., heat map).

In one embodiment, a host interface of a sensing device receives sensor data from a host system (e.g., data previously received from sensing device and/or other sensing devices, and stored in a memory device of the host system for later writing by host system to the memory device). The sensing device stores the sensor data in response to a write command received from the host system. The sensing device also stores data from an image stream generated by an image sensor. An inference engine of the sensing device generates inference results using the image stream and the sensor data as input. The sensing device stores the inference results in a non-volatile memory for later access by the host system. In response to receiving a read command from the host system, the sensing device provides the inference results to the host system (e.g., over a bus or network).

Figure 16:
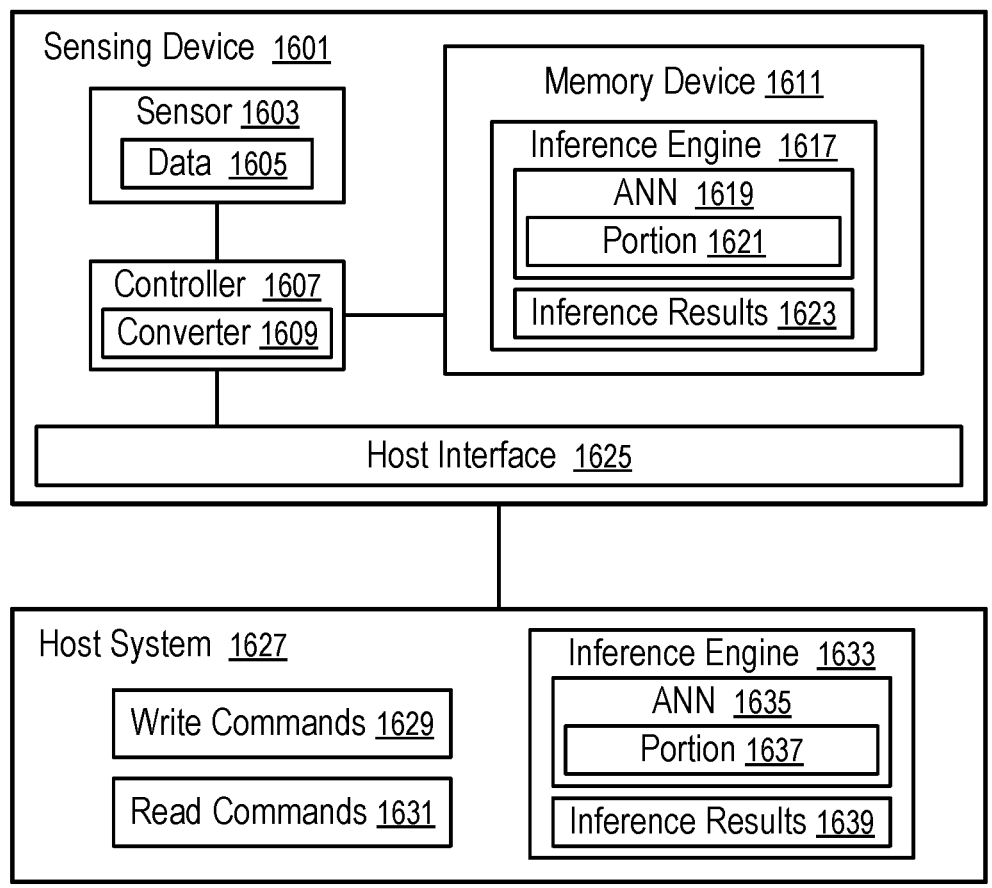
FIG. 16 shows a sensing device configured to process sensor data according to some embodiments.

FIG. 16 shows a sensing device (1601) configured to process sensor data according to some embodiments. In one embodiment, sensing device (1601) includes a sensor, a host interface, and a memory device with an inference engine. The inference engine generates inference results using data from the sensor as input, and stores the inference results for further processing by a host system. Sensing device (1601) may be, for example, a camera, GPS module, microphone, or other type of sensing device.

Sensing device (1601) includes a sensor (e.g., sensor 1603). Sensor (1603) may be, for example, an image sensor, camera, video camera, motion sensor, vibration sensor, force/stress sensor, deformation sensor, proximity sensor, temperature sensor, GPS (Global Positioning System) receiver, lidar, radar, brake sensor, speed sensor, accelerometer, airbag sensor, audio sensor/microphone, ultrasound sonar, or other type of sensor. Sensor (1603) outputs collected sensor data (e.g., data 1605). For example, data (1605) may be images, GPS location, recorded sound, etc. Data (1605) may be streaming data or may be discrete packets or frames of data.

Sensing device (1601) includes a memory device (e.g., memory device 1611). Memory device (1611) can include volatile memory (e.g., DRAM and/or SRAM) and/or non-volatile memory. Memory device (1611) may be embedded (e.g., HBM) or it may be separate modules (e.g., DIMM or SIMM modules).

Examples of non-volatile memory include flash memory, memory units formed based on negative-and (NAND) logic gates, negative-or (NOR) logic gates, Phase-Change Memory (PCM), magnetic memory (MRAM), resistive random-access memory (RRAM), cross point memory and other memory devices. A cross point memory device can use transistor-less memory elements, each of which has a memory cell and a selector that are stacked together as a column. Memory element columns are connected via two lays of wires running in perpendicular directions, where wires of one lay run in one direction in the layer located above the memory element columns, and wires of the other lay is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include read-only memory (ROM), programmable read-only memory (PROM), erasable programmable read-only memory (EPROM) and electronically erasable programmable read-only memory (EEPROM) memory, etc. Examples of volatile memory include dynamic random-access memory (DRAM) and static random-access memory (SRAM).

Memory device (1611) may include non-volatile memory, volatile memory, or a combination of non-volatile and volatile memories. For example, memory device (1611) may contain flash memory (e.g., SLC, MLC, TLC, QLC, etc.), cross point memory, DRAM, SRAM, other memory technologies, or any combination of memory technologies. Memory device (1611) may be in any form including, for example, solid-state disk, compact flash module, PCIe card, NVMe module, DIMM, SIMM, soldered to a printed circuit board, one or more die stacked and packaged with other integrated circuit components, or other formfactor.

In some embodiments, memory device (1611) has logic built-in to perform machine learning analytics (e.g., image classification, object detection, pixel segmentation, etc.). Memory device (1611) may be a general-purpose memory device or may be built as an application specific memory device (e.g., built specifically for autonomous vehicle applications). In one example, memory device (1611) is built as a wide-IO memory device optimized for machine learning tasks.

Memory device (1611) includes an inference engine (e.g., inference engine 1617). Inference engine (1617) includes an artificial neural network (ANN) (e.g., ANN 1619). ANN (1619) may be a portion of a larger ANN. ANN (1619) receives input data (e.g., data 1605), processes the input data, and generates inference results (e.g., inference results 1623) as output. In one example, data (1605) is vibration data from a vibration sensor. Inference results (1623) may be identification of a defect in a machine based on analyzing the vibration data. In one example, data (1605) is sonar data from a sonar sensor. Inference results (1623) may be identification of the distance of an object from the sonar sensor.

Sensing device (1601) includes a controller (e.g., controller 1607). Controller (1607) may be, for example, a microprocessor, graphics processor, embedded processor, embedded controller, central processing unit (CPU), system on a chip (SOC), application specific integrated circuit (ASIC), field programmable gate array (FPGA), neural network accelerator, or other type of controller. Controller (1607) may be composed of a single controller with a single processing core, a single controller with multiple processing cores, or multiple controllers. Controller (1607) and memory device (1611) may be configured on a printed circuit board. In some instances, controller (1607) and memory device (1611) are packaged together in a System on Chip (SoC).

Sensing device (1601) includes a host interface (e.g., host interface 1625). Host interface (1625) enables sensing device (1601) to communicate with a host system (e.g., host system 1627). Host interface (1625) can be used to transfer data and commands between sensing device (1601) and host system (1627). Host interface (1625) may be, for example, a wired interface or a wireless interface.

A wired interface, may be, for example, in accordance with a communication protocol for a Peripheral Component Interconnect express (PCIe) bus, a Serial Advanced Technology Attachment (SATA) bus, a Serial Attached SCSI (SAS) bus, a Universal Serial Bus (USB) bus, a Storage Area Network (SAN), an IEEE-1394 bus, a Non-Volatile Memory express (NVMe) bus, a Non-Volatile Memory Host Controller Interface Specification (NVMHCIS)) interface, etc.

A wireless interface may be, for example, in accordance with a communication protocol such as Bluetooth, a mobile wireless network such as 4G or 5G, a local area network (LAN), a wide area network (WAN), an intranet, an extranet, the Internet, and/or any combination thereof.

Host system (1627) is a computing device connected to sensing device (1601). Host system (1627) may be, for example, a computer, embedded computer, server, cloud server, edge server, laptop, tablet, smartphone, or other electronic device controlled by a processing device.

Host system (1627) includes an inference engine (e.g., inference engine 1633). Inference engine (1633) includes an ANN (e.g., ANN 1635). ANN (1635) may be a portion of a larger ANN. ANN (1635) receives input data, processes the input data, and generates inference results (1639) as output. In one example, inference results (1623) from sensing device (1601) are input to ANN (1635) in host system (1627) and inference results (1639) are generated from inference results (1623). In one example, inference results (1623) may be detection of abnormal vibration in a machine. ANN (1635) in host system (1627) may receive inference results (1623) as input and generate inference results (1639) as output (e.g., shut down the machine, notify machine operator, etc.)

In one example, a system includes: sensor (1603) generating data (1605), memory device (1611) stacked with sensor (1603) and configured to store data (1605) and portion (1621) of ANN (1619), host interface (1625) configured to communicate with host system (1627), and host system (1627) that stores portion (1637) of ANN (1635). Memory device (1611) includes inference engine (1617) configured to generate inference results (1623) using data (1605) as input to portion (1621) of ANN (1619). Host interface (1625) is configured to send inference results (1623) to host system (1627) for processing by host system (1627) using portion (1637) of ANN (1635).

For example, data (1605) may comprise GPS location data. Portion (1621) of ANN (1619) may generate inference results (1623) (e.g., sensor 1603 is 100 meters from a target destination) based on input data (1605). Host interface (1625) may send inference results (1623) to host system (1627) for processing by portion (1637) of ANN (1635). ANN (1635) may generate inference results (1639) (e.g., course correction to move sensor (1603) toward target destination).

In one example, sensor (1603) generates data (1605) at a rate that exceeds the communication bandwidth between the host interface (1625) and host system (1627). For example, sensor (1603) may generate data (1605) at, for example, 900 MB/second, exceeding the communication bandwidth between the host interface (1625) and host system (1627) (e.g., 380 MB/second). Sensing device (1601) processes data (1605) and generates inference results (1623). Host system (1627) accesses inference results (1623) by sending commands (e.g., read commands 1631 and write commands 1629) to host interface (1625).

In one example, inference engine (1617) generates inference results (1623). Controller (1607) is configured to send inference results (1623) to host system (1627). Host system (1627) generates inference results (1639) using inference results (1623) as input to inference engine (1633). Host system (1627) sends a write command (1629) to be executed by controller (1607) to store inference results (1639) in memory device (1611).

In one example, memory device (1611) stores inference results (1623). Controller (1607) is configured to execute read commands (1631) from host system (1627) to access the stored inference results (1623).

In one example, host system (1627) sends a portion of ANN (1635) to host interface (1625) in response to evaluating image data from host interface (1625) or evaluating prior inference results (1623) received from host interface (1625). For example, host system (1627) may evaluate image data from sensor (1603) and determine that many image frames are being dropped due to bandwidth limitations of the communication link between host interface (1625) and host system (1627). Host system (1627) may respond by sending a portion of ANN (1635) to sensing device (1601).

In one example, data (1605) from sensor (1603) is provided in other than image form (e.g., sound recording from a microphone). A converter (e.g., converter 1609) is configured to convert data (1605) to an image form (e.g., spectrogram) to provide as the input to portion (1621) of ANN (1619).

In one example, sensor (1603) and memory device (1611) are encapsulated in a package. For example, sensor (1603) and memory device (1611) may be encapsulated together in a Ball Grid Array (BGA) integrated circuit package or a camera device.

In one example, sensor (1603) is formed on a first integrated circuit die and memory device (1611) is formed on one or more second integrated circuit die(s). The first integrated circuit die and second integrated circuit die(s) are stacked to form a three-dimensional integrated circuit.

In one example, host interface (1625) is configured to receive a write command (1629) from host system (1627) to store a portion of ANN (1635) in memory device (1611). Host system (1627) sends write command (1629) in response to evaluating prior data (1605) generated by sensor (1603). The evaluating is performed by portion (1637) of ANN (1635). For example, ANN (1635) in host system (1627) may evaluate data (1605) from sensor (1603) (e.g., a microphone) and identify patterns (e.g., voiceprints) that can be offloaded to sensing device (1601). Host system (1627) sends write command (1629) to store a portion of ANN (1635) in memory device (1611) to assist with processing data (1605).

In one example, host interface (1625) is configured to communicate with host system (1627) in accordance with a serial communication protocol (e.g., Ethernet, PCIe, Infiniband, SATA, SAS, USB, etc.).

In one example, data (1605) from sensor (1603) is collected and stored in memory device (1611) stacked with sensor (1603). Memory device (1611) further stores portion (1621) of an ANN. Host interface (1625) communicates with host system (1627). Host system (1627) stores portion (1637) of the ANN. Inference engine (1617) of memory device (1611) generates inference results (1623) using the stored collected data as input to portion (1621) of the ANN. Host interface (1625) sends inference results (1623) to host system (1627) for processing using portion (1637) of the ANN.

Figure 17:
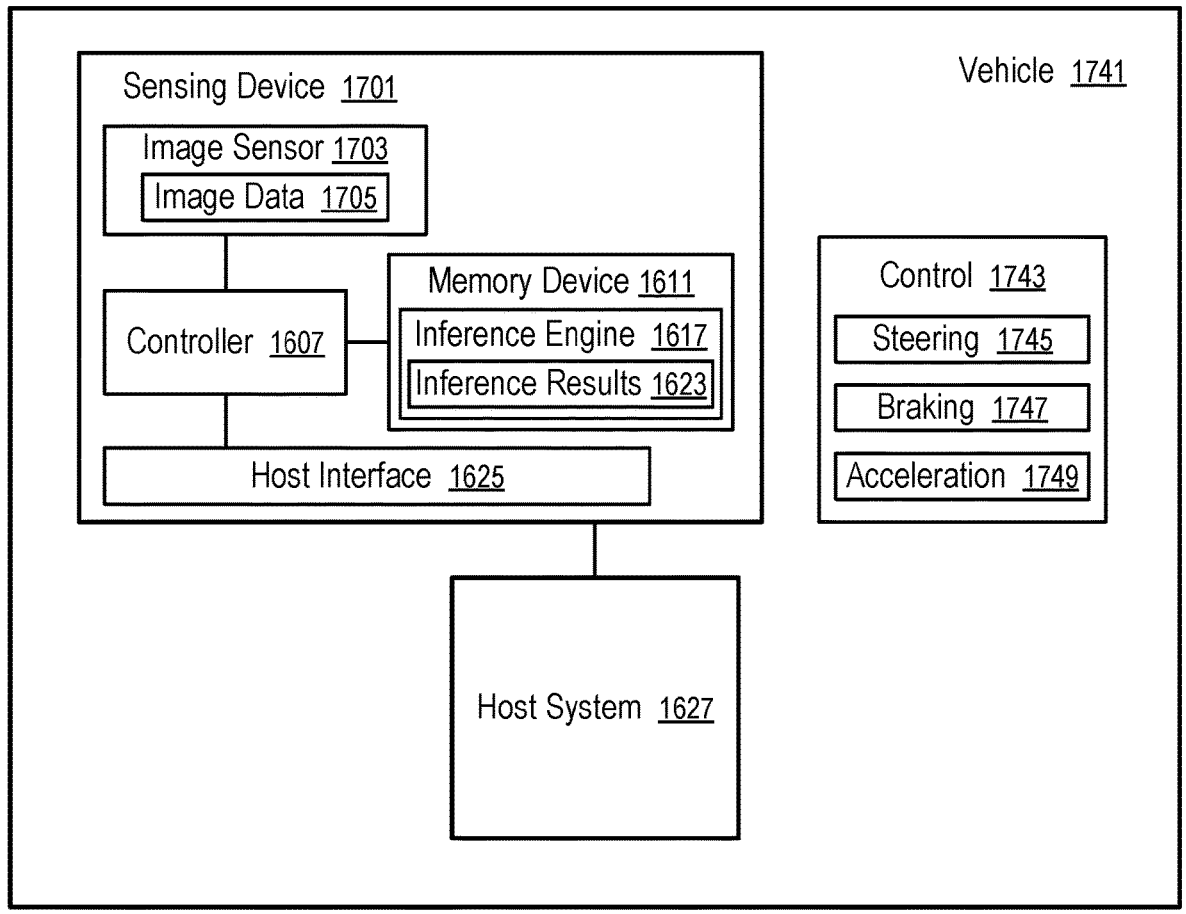
FIG. 17 shows a system having a vehicle configured to collect and process sensor data according to some embodiments.

FIG. 17 shows a system having a vehicle (1741) configured to collect and process sensor data according to some embodiments. In one embodiment, vehicle (1741) includes a sensing device with memory and an inference engine and control for the vehicle. Vehicle (1741) may be, for example, an autonomous vehicle, an electric vehicle, a gasoline or diesel-powered vehicle, or other vehicle. Vehicle (1741) may be a land operated vehicle, watercraft, aircraft, or other type of vehicle.

In one embodiment, vehicle (1741) includes sensing device (1701). In one case, sensing device (1701) is an example of sensing device (1601) of FIG. 16. In one example, sensing device (1701) includes an image sensor (e.g., image sensor 1703) which generates image data (e.g., image data 1705). In one example, inference engine (1617) generates inference results (1623) using image data (1705) as input. Inference results (1623) may be, for example, image classification, object detection, or pixel segmentation.

In one example, sensing device (1701) comprises a camera that includes image sensor (1703). Image data (1705) is, for example, an image stream including frames.

In one embodiment, vehicle (1741) includes control (e.g., control 1743) for the vehicle. Control (1743) controls vehicle (1741) functions including, for example, steering (e.g., steering (1745), braking (e.g., braking 1747) and acceleration (e.g., acceleration 1749). Vehicle (1741) generates input for control (1743) based on inference results (1623) from inference engine (1617). For example, inference results (1623) may identify an object in the path of vehicle (1741). Control (1743) may use inference results (1623) as input and generate control (1743) (e.g., steering 1745 or braking 1747) to prevent vehicle (1741) from colliding with the identified object.

In one example, host system (1627) is a computing system (e.g., embedded computer, system controller, central control unit, etc.) located within vehicle (1741). In an alternative embodiment, host system (1627) can be a computing system (e.g., a server, edge server, cloud server, cloud platform, etc.) located external to vehicle (1741).

Figure 18:
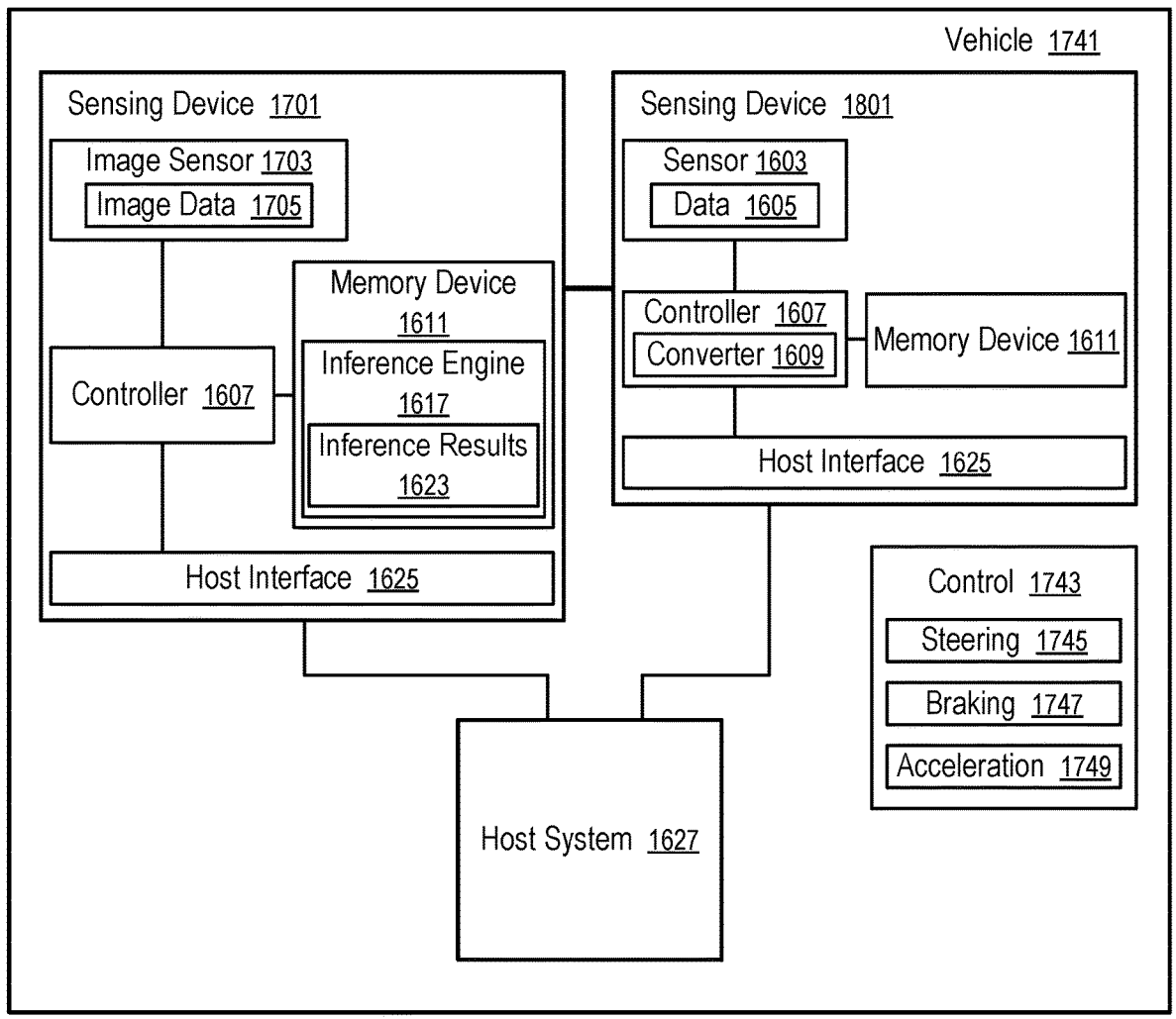
FIG. 18 shows a system configured to collect and process different types of sensor data according to some embodiments.

FIG. 18 shows a system configured to collect and process different types of sensor data according to some embodiments. The system includes first sensing device (1701) and second sensing device (1801). Sensing device (1801) includes sensor (1603) that generates sensor data in a form (e.g., sound data) other than an image form. In some embodiments, sensing device (1701) and sensing device (1801) are each an example of sensing device (1601) of FIG. 16.

In one embodiment, sensing device (1701) includes image sensor (1703) and memory device (1611). Image sensor (1703) generates image data (1705). Sensing device (1801) includes sensor (1603) that generates data (1605) that is not in image form. Sensing device (1801) includes a converter that converts sensor data (1605) to image data. Sensing device (1801) sends the converted data to the first sensing device for further processing. In one example, sensor (1603) of sensing device (1801) comprises one or more microphones, and data (1605) is sound data. Converter (1609) converts the sound data to image form (e.g., spectrogram) and sends the spectrogram to sensing device (1701) for further processing.

In one example, inference engine (1617) of sensing device (1701) uses the converted image data from sensing device (1801) as additional input used to generate inference results (1623). In one example, sensor (1603) may be, for example, a lidar sensor, a radar sensor, or a sonar sensor. Data (1605) from sensor (1603) is converted to image data and sent to sensing device (1701) as input to inference engine (1617). For example, inference engine (1617) may combine image data (1705) and image data from sensing device (1801) to identify an object and determine the distance from sensing device (1801) to the object.

Figure 19:
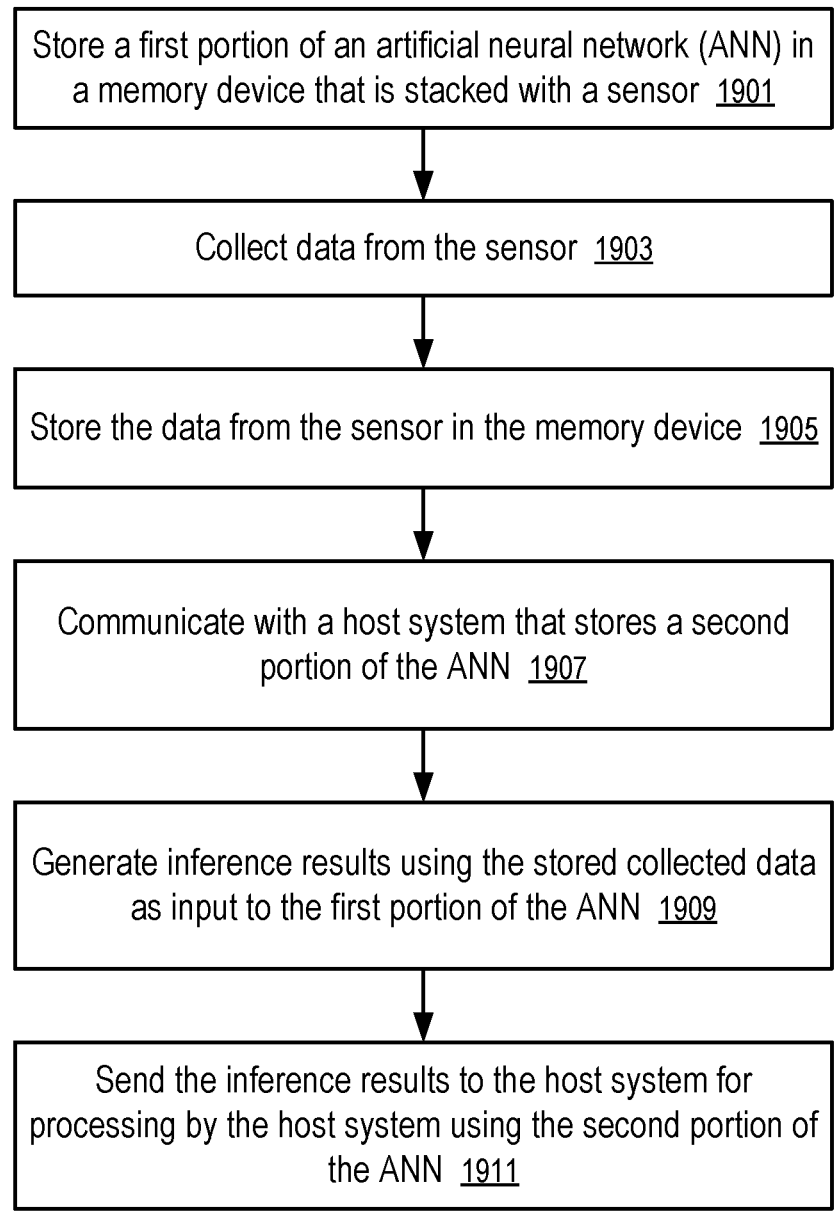
FIG. 19 shows a method implemented for a sensing device that communicates with a host system according to one embodiment.

FIG. 19 shows a method implemented in a sensing device and a host system according to one embodiment. A portion of an artificial neural network (ANN) is stored in a memory device that is stacked with a sensor. Data is collected from the sensor and also stored in the memory device. Inference results are generated by the ANN using the stored collected data from the sensor. The inference results are sent to a host system for processing by a different portion of the ANN. For example, the method of FIG. 19 can be implemented in the system of FIG. 16. In one example, the host system is host system (1627). In one example, the sensor is sensor (1603).

The method of FIG. 19 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 19 is performed at least in part by one or more processing devices (e.g., controller 1607 of sensing device 1601 of FIG. 16).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 1901, a first portion of an ANN is stored in a memory device stacked with a sensor. In one example, the ANN is ANN (1619). In one example, the first portion is portion (1621).

At block 1903, data from the sensor is collected. In one example, the data is data (1605). In one example, sensor (1603) is a sonar sensor.

At block 1905, data from the sensor is stored in the memory device. In one example, the memory device is memory device (1611). In one example, the data is streaming data from sensor (1603).

At block 1907, communication is established with a host system that stores a second portion of the ANN. In one example, the ANN is ANN (1635). In one example, the second portion is portion (1637).

At block 1909, the stored collected data is used as input to the first portion of the ANN and inference results are generated. In one example, the inference results are inference results (1623).

At block 1911, the inference results are sent to the host system for processing by the host system using the second portion of the ANN. In one example, inference results (1623) are pixel segmentation of an image from sensor (1603). In one example, processing by the host system is identifying an object in the pixel segmented inference results.

Figure 20:
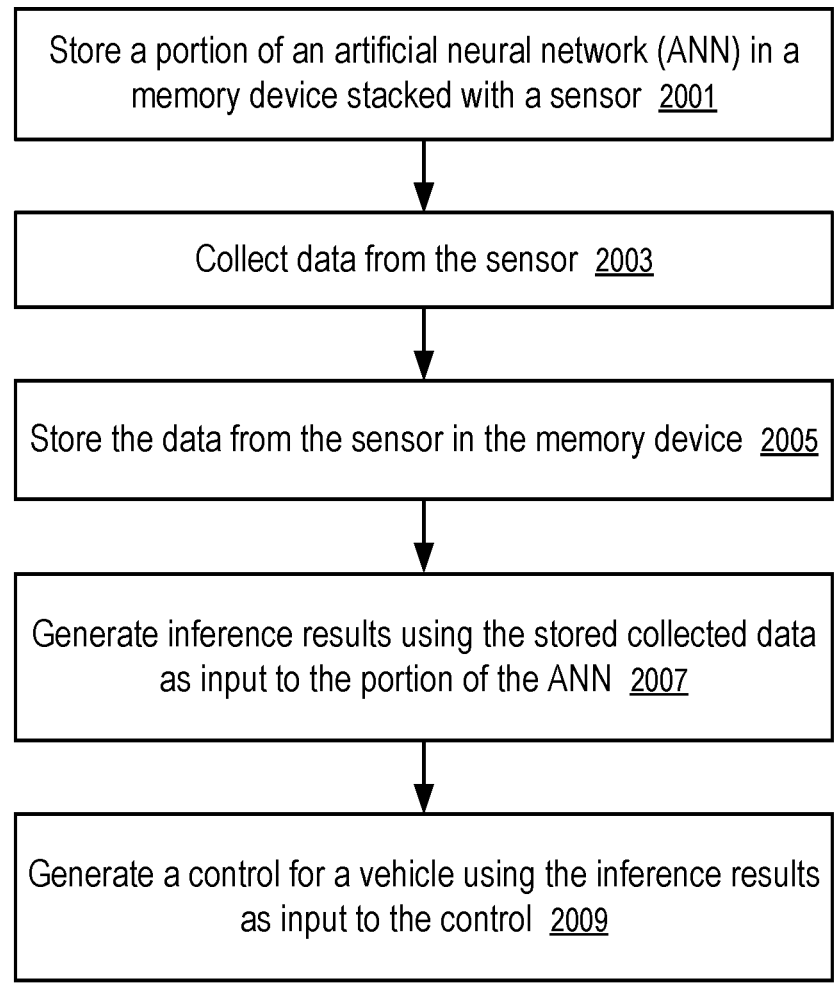
FIG. 20 shows a method implemented for a sensing device of a vehicle according to one embodiment.

FIG. 20 shows a method implemented in a sensing device of a vehicle according to one embodiment. At least a portion of an artificial neural network (ANN) is stored in a memory device stacked with a sensor. In some cases, all of the neurons for the ANN can be stored in the memory device. Data is collected from the sensor and stored in the memory device. Inference results are generated by the ANN using the stored collected data from the sensor. The inference results are used as input to generate a control for a vehicle. For example, the method of FIG. 20 can be implemented in the system of FIG. 17. In one example, the vehicle is vehicle (1741). In one example, the control is control (1743).

The method of FIG. 20 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 20 is performed at least in part by one or more processing devices (e.g., controller 1607 of sensing device 1701 of FIG. 17).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 2001, a first portion of an ANN is stored in a memory device stacked with a sensor. In one example, the first portion of the ANN is received from host system (1627). In one example, the memory device is memory device (1611).

At block 2003, data from the sensor is collected. In one example, the sensor is image sensor (1703). In one example, the data is image data (1705).

At block 2005, data from the sensor is stored in the memory device. In one example, memory device (1611) is a non-volatile memory device. In one example, image data (1705) is a video stream.

At block 2007, the stored collected data is used as input to the first portion of the ANN and inference results are generated. In one example, the stored collected data is collected from image sensor (1703). In one example, image data (1705) is discrete images from a camera. In one example, the first portion of the ANN stored in the memory device is the entire ANN, which can be fully stored in the memory device.

At block 2009, a control for a vehicle is generated using the inference results as input to the control. In one example, the control (1743) is steering (1745), braking (1747), or acceleration (1749).

Figure 21:
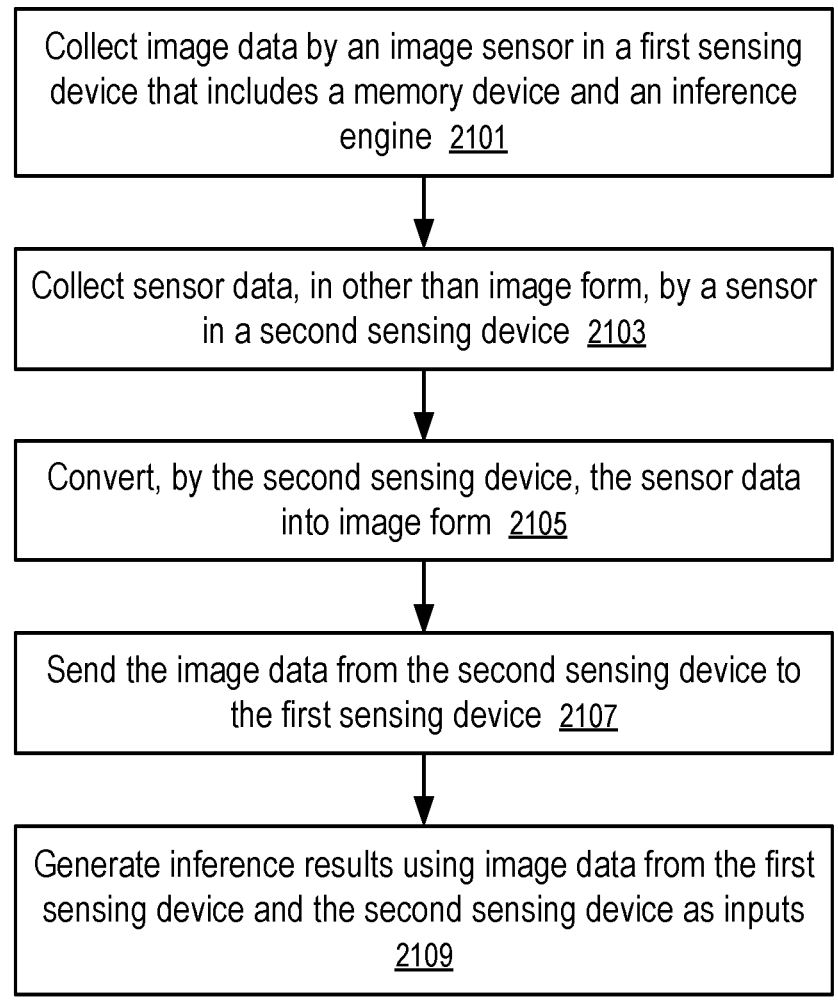
FIG. 21 shows a method for collecting and processing different types of sensor data according to some embodiments.

FIG. 21 shows a method for collecting and processing different types of sensor data according to some embodiments. Image data is generated by an image sensor in a first sensing device. Sensor data, in a form other than image form, is generated by a sensor in a second sensing device. The sensor data is converted to image form by the second sensing device and sent to the first sensing device for processing. The first sensing device generates inference results using the image data from the first and second sensing devices as input. For example, the method of FIG. 21 can be implemented in the system of FIG. 18. In one example, the second sensing device is sensing device (1801).

The method of FIG. 21 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 21 is performed at least in part by one or more processing devices (e.g., controller 1607 of sensing device 1801 of FIG. 18).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 2101, data from an image sensor in a first sensing device that includes a memory device and an inference engine is collected. In one example, the first sensing device is sensing device (1701), which is a camera.

At block 2103, sensor data in other than an image form is collected by a sensor in a second sensing device. In one example, the second sensing device is sensing device (1801). In one example, sensor (1603) of sensing device (1801) is a sonar sensor.

At block 2105, the sensor data is converted into image form by the second sensing device. In one example, converter (1609) converts data (1605) into image form. In one example, the converter uses a Fourier transform to perform the conversion.

At block 2107, the image data from the second sensing device is sent to the first sensing device. In one example, image data from the second sensing device is lidar images from a lidar sensor.

At block 2109, inference results are generated using the image data from the first and second sensing devices as input. In one example, inference results (1623) may represent detection of an object and identification of the velocity of the object.

In one embodiment, a system comprises: a first sensor (e.g., sensor 1603) configured to generate first data (e.g., data 1605); a memory device (e.g., memory device 1611) configured to store the generated first data, and a first portion (e.g., portion 1621) of an artificial neural network (ANN) (e.g., ANN 1619); and a host interface (e.g., host interface 1625) configured to communicate with a host system (e.g., host system 1627) that stores a second portion (e.g., portion 1637) of the ANN (e.g., ANN 1635); wherein the memory device is stacked with the first sensor, and the memory device comprises an inference engine (e.g., inference engine 1617) configured to generate inference results (e.g., inference results 1623) using the stored first data as input to the first portion of the ANN; and wherein the host interface is further configured to send the inference results to the host system for processing by the host system using the second portion of the ANN.

In one embodiment, the system further comprises a camera that includes the first sensor, wherein the first data is an image stream including frames.

In one embodiment, the first data is generated by the first sensor at a rate that exceeds a communication bandwidth between the host interface and the host system; and the host system accesses the inference results by sending commands (e.g., read commands and write commands) to the host interface.

In one embodiment, the inference engine is a first inference engine and the generated inference results are first inference results; the system further comprises a controller (e.g., controller 1607) configured to send the first inference results to the host system; the host system comprises a second inference engine (e.g., inference engine 1633) configured to generate second inference results (e.g., inference results 1639) from the first inference results; and the host system sends a write command (e.g., write commands 1629) executed by the controller to store the second inference results in the memory device.

In one embodiment, the memory device further stores the first inference results; and the controller is further configured to execute read commands (e.g., read commands 1631) received from the host system via the host interface, the read commands to access the stored first inference results.

In one embodiment, the host system sends the first portion (e.g., portion 1637 of ANN 1635) to the host interface in response to evaluating at least one of prior inference results received from the host interface, or image data received from the host interface.

In one embodiment, the first data is in other than an image form, and the system further comprises a converter (e.g., converter 1609) configured to convert the first data to an image form to provide as the input to the first portion of the ANN.

In one embodiment, the first sensor is an image sensor (e.g., image sensor 1703), the first data is first image data (e.g., image data 1705), and the system further comprises: a first sensing device (e.g., sensing device 1701) that includes the image sensor and the memory device; and a second sensing device (e.g., sensing device 1801) configured to send second image data to the first sensing device, wherein the second sensing device includes a second sensor configured to generate sensor data in other than an image form (e.g., sound or radar data), and a controller configured to convert the sensor data to the second image data.

In one embodiment, the sensor data comprises sound data generated by at least one microphone.

In one embodiment, the second sensor is a lidar sensor, a radar sensor, or a sonar sensor.

In one embodiment, the inference engine uses the second image data as additional input to generate the inference results.

In one embodiment, the system further comprises a package that encapsulates the first sensor and the memory device. For example, the first sensor and the memory device may be encapsulated in a BGA integrated circuit package.

In one embodiment, the first sensor is formed on a first integrated circuit die; the memory device is formed on at least one second integrated circuit die; and the first integrated circuit die and the least one second integrated circuit die are stacked to form a three-dimensional integrated circuit.

In one embodiment, the host interface is further configured to receive a write command from the host system to store the first portion of the ANN in the memory device; the host system sends the write command in response to evaluating prior data generated by the first sensor; and the evaluating is performed using the second portion of the ANN.

In one embodiment, the inference results include at least one of image classification, object detection, or pixel segmentation.

In one embodiment, the system further comprises: a control for at least one of steering, braking, or acceleration of a vehicle; wherein the vehicle generates input for the control based on the inference results from the inference engine.

In one embodiment, the host interface is further configured to communicate with the host system in accordance with a serial communication protocol (e.g., Ethernet, PCIe, SATA, SAS, etc.).

In one embodiment, a method comprises: collecting data from a sensor; storing, by a memory device stacked with the sensor, the collected data; storing, by the memory device, a first portion of an artificial neural network (ANN); communicating, by a host interface, with a host system that stores a second portion of the ANN; generating, by an inference engine of the memory device, inference results using the stored collected data as input to the first portion of the ANN; and sending, by the host interface, the inference results to the host system for processing by the host system using the second portion of the ANN.

In one embodiment, the collected data is sound data, the method further comprising converting the sound data to at least one image (e.g., a spectrogram) prior to use as the input to the first portion of the ANN.

In one embodiment, a non-transitory computer-readable medium stores instructions which, when executed on at least one computing device, cause the at least one computing device to: store (e.g., by a memory device) a first portion of an artificial neural network (ANN) received from a host system; collect data from a sensing device; store (e.g., by the memory device) the collected data; generate inference results using the collected data as input to the first portion of the ANN; and send, by an interface, the inference results to the host system for processing by the host system.

The present disclosure includes methods and apparatuses which perform the methods described above, including data processing systems which perform these methods, and computer readable media containing instructions which when executed on data processing systems cause the systems to perform these methods.

A typical data processing system may include includes an inter-connect (e.g., bus and system core logic), which inter-connects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
    a first image sensor configured to generate first image data;
    at least one second sensor configured to generate sensor data in other than an image form, wherein the sensor data comprises sound data generated by at least one microphone;
    at least one controller configured to convert the sound data to second image data using a Fourier transform, wherein the sound data is a time domain signal, and the sound data is converted to a two-dimensional image representation with each position of the two-dimensional image having a value corresponding to a frequency intensity;
    a memory device configured to store the generated first image data, and a first portion of an artificial neural network (ANN); and
    a host interface configured to communicate with a host system that stores a second portion of the ANN;
    wherein the memory device is stacked with the first image sensor, and the memory device comprises an inference engine configured to generate inference results using the stored first image data as input to the first portion of the ANN, and further using the second image data as additional input to the first portion of the ANN;
    wherein the host interface is further configured to send the inference results to the host system for processing by the host system using the second portion of the ANN;
    wherein the host interface is further configured to receive a write command from the host system to store a third portion of the ANN in the memory device;
    wherein the host system is further configured to send the third portion for storing in the memory device in response to evaluating prior data generated by the first image sensor using the second portion of the ANN, and further in response to determining that image frames are being dropped due to bandwidth limitations of communication between the host interface and the host system.

2. The system of claim 1, further comprising a camera that includes the first image sensor, wherein the first image data is an image stream including frames.

3. The system of claim 2, wherein:
    the first image data is generated by the first image sensor at a rate that exceeds a communication bandwidth between the host interface and the host system; and
    the host system accesses the inference results by sending commands to the host interface.

4. The system of claim 1, wherein:
    the write command is a first write command;
    the inference engine is a first inference engine and the generated inference results are first inference results;
    the controller is configured to send the first inference results to the host system;
    the host system comprises a second inference engine configured to generate second inference results from the first inference results; and
    the host system sends a second write command executed by the controller to store the second inference results in the memory device.

5. The system of claim 4, wherein:
    the memory device further stores the first inference results; and
    the controller is further configured to execute read commands received from the host system via the host interface, the read commands to access the stored first inference results.

6. The system of claim 1, wherein the host system is further configured to send the third portion to the host interface in response to evaluating inference results received from the host interface.

7. The system of claim 1, further comprising:
    a first sensing device that includes the first image sensor and the memory device; and
    a second sensing device that includes the second sensor and the controller.

8. The system of claim 1, wherein the second sensor includes a sonar sensor.

9. The system of claim 1, further comprising a package that encapsulates the first image sensor and the memory device.

10. The system of claim 1, wherein:
    the first image sensor is formed on a first integrated circuit die;
    the memory device is formed on at least one second integrated circuit die; and
    the first integrated circuit die and the at least one second integrated circuit die are stacked to form a three-dimensional integrated circuit.

11. The system of claim 1, wherein the inference results include at least one of image classification, object detection, or pixel segmentation.

12. The system of claim 11, wherein the system further comprises:

a control for at least one of steering, braking, or acceleration of a vehicle;

wherein the vehicle generates input for the control based on the inference results from the inference engine.

13. The system of claim 1, wherein the host interface is further configured to communicate with the host system in accordance with a serial communication protocol.

14. The system of claim 1, wherein the controller converts the sound data to a spectrogram or heat map.

15. A method comprising:

collecting image data from a first image sensor;

storing, by a memory device, the collected image data;

storing, by the memory device, a first portion of an artificial neural network (ANN);

generating, by a second sensor, sound data;

converting, the sound data to second image data;

communicating, by a host interface, with a host system that stores a second portion of the ANN;

generating, by an inference engine of the memory device, inference results using the stored collected image data as input to the first portion of the ANN, and further using the second image data as additional input to the first portion of the ANN; and sending, by the host interface, the inference results to the host system for processing by the host system using the second portion of the ANN;

wherein the host interface is further configured to receive a write command from the host system to store a third portion of the ANN in the memory device;

wherein the host system sends the third portion in response to evaluating prior data generated by the first image sensor using the second portion of the ANN, and further in response to determining that image frames are being dropped due to bandwidth limitations of communication between the host interface and the host system.

16. The method of claim 15, wherein the sound data is converted to the second image data using a Fourier transform.

17. A non-transitory computer-readable medium storing instructions which, when executed on at least one computing device, cause the at least one computing device to:

store, in a memory device, at least a first portion of an artificial neural network (ANN) received from a computing system;

collect image data from an image sensor;

generate inference results using the collected image data as input to the first portion of the ANN;

send, by a communication interface, the inference results to the computing system for processing using a second portion of the ANN stored at the computing system; and receive a third portion of the ANN from the computing system to store in the memory device, wherein the computing system sends the third portion in response to determining that image frames are being dropped due to bandwidth limitations of communication between the communication interface and the computing system.

* * * * *